US010940909B2

(12) United States Patent
Masuda et al.

(10) Patent No.: US 10,940,909 B2
(45) Date of Patent: Mar. 9, 2021

(54) WIRELESS RECEIVING DEVICE FOR HUMAN POWERED VEHICLE

(71) Applicant: SHIMANO INC., Sakai (JP)

(72) Inventors: Takaya Masuda, Sakai (JP); Takafumi Suzuki, Sakai (JP); Toshihiko Takahashi, Sakai (JP)

(73) Assignee: SHIMANO INC., Sakai (JP)

( * ) Notice: Subject to any disclaimer, the term of this patent is extended or adjusted under 35 U.S.C. 154(b) by 311 days.

(21) Appl. No.: 15/892,424

(22) Filed: Feb. 9, 2018

(65) Prior Publication Data
US 2019/0248438 A1 Aug. 15, 2019

(51) Int. Cl.
*B62J 99/00* (2020.01)
*B62J 45/00* (2020.01)
(Continued)

(52) U.S. Cl.
CPC ............... *B62J 99/00* (2013.01); *B62J 45/00* (2020.02); *B62J 45/20* (2020.02); *B62J 45/40* (2020.02)

(58) Field of Classification Search
CPC ........ B62M 25/08; B62M 25/04; B62M 9/12; B62M 9/122; B62M 9/124; B62M 9/1242; B62M 9/132; B62M 2009/12413; B62J 99/00; B62J 99/0013; B62J 99/002; B62J 99/004; B62J 45/00; B62J 45/20; B62J 45/40; B62K 23/00; B62K 23/04; Y02D 70/1224; Y02D 70/144; Y02D 70/22; H04W 52/00; H04W 52/02; H04W 52/0206; H04W 52/0209; H04W 52/0245; H04W 52/0229; H04W 52/0225; H04W 52/0232; H04W 52/0251; H04W 52/0254;
(Continued)

(56) References Cited

U.S. PATENT DOCUMENTS

| 8,909,424 B2 | 12/2014 | Jordan et al. |
| 2009/0240858 A1* | 9/2009 | Takebayashi ........ B62M 25/08 710/110 |
| 2015/0033896 A1 | 2/2015 | Jordan |

FOREIGN PATENT DOCUMENTS

CN 106973361 7/2017

OTHER PUBLICATIONS

Anastasi, G. et al., "Energy conservation in wireless sensor networks: A survey", Ad Hoc Networks, Jul. 29, 2008, pp. 537-568, vol. 7 https://www.sciencedirect.com/science/article/abs/pii/S1570870508000954?via%3Dihub.

* cited by examiner

*Primary Examiner* — Anthony R Jimenez
(74) *Attorney, Agent, or Firm* — Mori & Ward, LLP

(57) ABSTRACT

A wireless receiving device for a human powered vehicle comprises a receiver having a first mode, and a second mode in which the receiver consumes less electric power than in the first mode. A controller is configured to set the receiver with the second mode if the receiver does not receive the communication signal in a first-mode period during which the receiver operates in the first mode. The controller is configured to count a consecutive number of a plurality of no-communication periods if no-communication periods consecutively occur. The controller is configured to set the receiver with the first mode if the consecutive number of the no-communication periods is less than a count threshold. The controller is configured to control the receiver to continue the second mode until a release condition is satisfied if the consecutive number is more than or equal to the count threshold.

26 Claims, 16 Drawing Sheets

(51) Int. Cl.
 *B62J 45/20* (2020.01)
 *B62J 45/40* (2020.01)
(58) Field of Classification Search
 CPC ............... H04W 56/00; H04W 56/001; H04W 56/0015; H04W 56/005
 USPC .......................................................... 701/36
 See application file for complete search history.

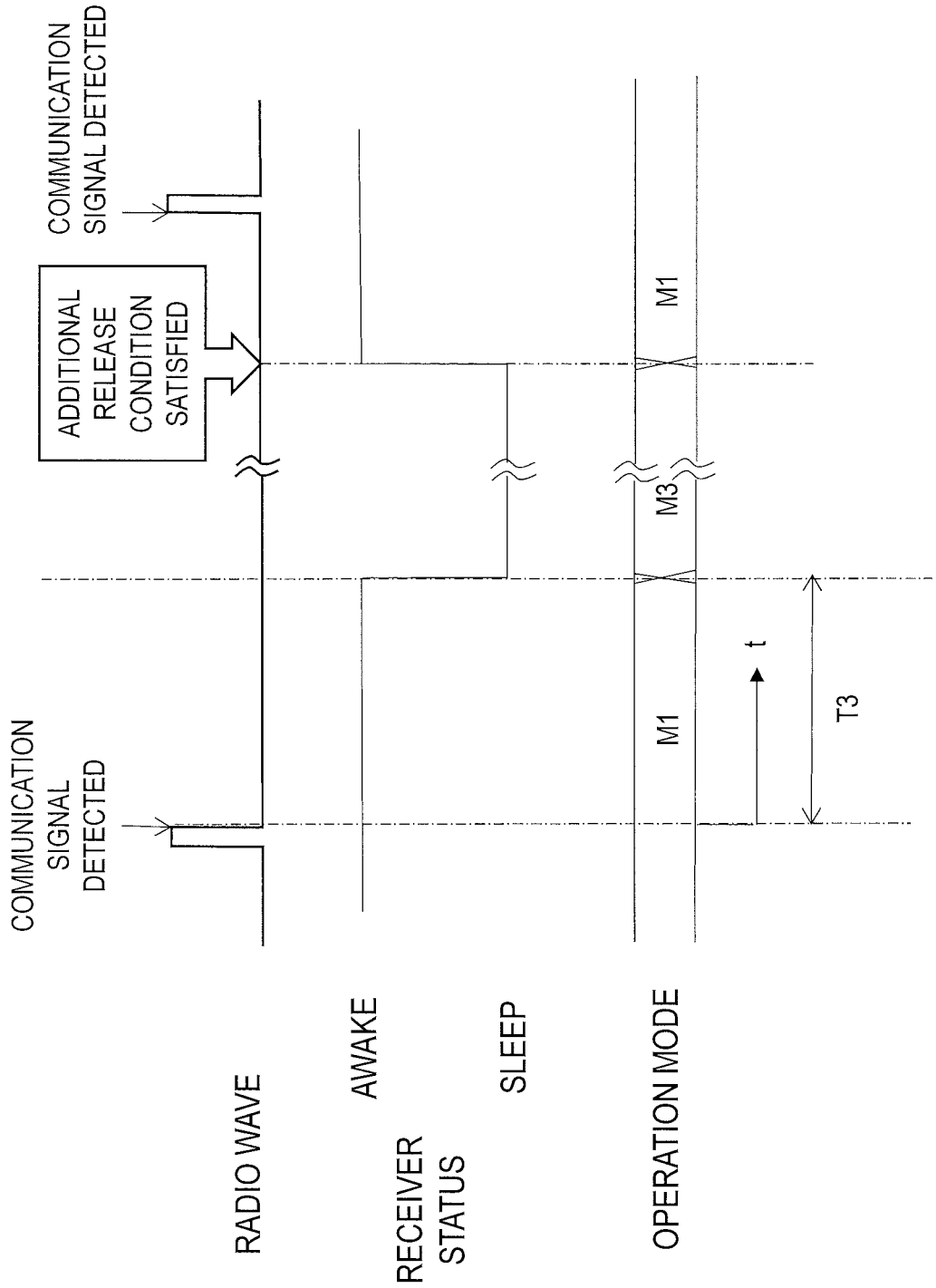

WIRELESS RECEIVING DEVICE FOR HUMAN POWERED VEHICLE

BACKGROUND OF THE INVENTION

Field of the Invention

The present invention relates to a wireless receiving device for a human powered vehicle.

Discussion of the Background

Wireless receiving devices for human powered vehicles such as bicycles include wireless communication devices to receive wireless signals from operation devices attached to bicycle handles to operate bicycle components such as derailleurs.

SUMMARY OF THE INVENTION

In accordance with a first aspect of the present invention, a wireless receiving device for a human powered vehicle comprises a receiver and a controller. The receiver is configured to wirelessly receive a radio wave including a communication signal to communicate with a component of the human powered vehicle. The receiver is configured to execute at least one of operation modes including a first mode, and a second mode in which the receiver consumes less electric power than in the first mode. The controller is configured to set the receiver with the second mode if the receiver does not receive the communication signal in a first-mode period during which the receiver operates in the first mode. The controller is configured to count a consecutive number of a plurality of no-communication periods if no-communication periods consecutively occur. Each of the no-communication periods is a period in which the receiver does not receive the communication signal during an entirety of the first-mode period. The controller is configured to set the receiver with the first mode if the consecutive number of the no-communication periods is less than a count threshold. The controller is configured to control the receiver to continue operating in the second mode until a release condition is satisfied if the consecutive number of the no-communication periods is more than or equal to the count threshold.

With the wireless receiving device according to the first aspect, it is possible to reduce power consumption.

In accordance with a second aspect of the present invention, the wireless receiving device according to the first aspect is configured so that the receiver does not receive the communication signal in the first-mode period if the receiver does not receive the communication signal for a threshold time in the first-mode period.

With the wireless receiving device according to the second aspect, it is possible to further reduce power consumption.

In accordance with a third aspect of the present invention, the wireless receiving device according to the first aspect is configured so that the receiver does not to receive the communication signal in the first-mode period if the receiver receives the radio wave other than the communication signal in the first-mode period.

With the wireless receiving device according to the third aspect, it is possible to further reduce power consumption.

In accordance with a fourth aspect of the present invention, the wireless receiving device according to any one of the first to third aspects is configured so that the controller is configured to set the receiver with the first mode if the receiver receives the radio wave while the receiver operates in the second mode, after the release condition is satisfied.

With the wireless receiving device according to the fourth aspect, it is possible to further reduce power consumption.

In accordance with a fifth aspect of the present invention, the wireless receiving device according to any one of the first to fourth aspects is configured so that the release condition is a condition in which a first lapse time passes after the consecutive number of the no-communication signal periods becomes more than or equal to the count threshold.

With the wireless receiving device according to the fifth aspect, it is possible to reduce a user's operation to enable the receiver to operate in the first mode.

In accordance with a sixth aspect of the present invention, the wireless receiving device according to any one of the first to fourth aspects is configured so that the release condition is a condition in which a release mechanism is manipulated after the consecutive number of the no-communication signal periods becomes more than or equal to the count threshold.

With the wireless receiving device according to the sixth aspect, it is possible to further reduce power consumption.

In accordance with a seventh aspect of the present invention, the wireless receiving device according to any one of the first to fourth aspects is configured so that the release condition is a condition in which a sensor detects information regarding an operational state of the human powered vehicle after the consecutive number of the no-communication signal periods becomes more than or equal to the count threshold.

With the wireless receiving device according to the seventh aspect, it is possible to reduce a user's operation to enable the receiver to operate in the first mode.

In accordance with an eighth aspect of the present invention, the wireless receiving device according to according to any one of the first to seventh aspects is configured so that the receiver is configured to receive the radio wave in an awake period. The receiver is configured not to receive the radio wave in a sleep period. An entire period during which the receiver is in the first mode is the awake period.

With the wireless receiving device according to the eighth aspect, it is possible to further reduce power consumption.

In accordance with a ninth aspect of the present invention, the wireless receiving device according to according to any one of the first to seventh aspects is configured so that the receiver is configured to receive the radio wave in an awake period. The receiver is configured not to receive the radio wave in a sleep period. The awake period and the sleep period occur while the receiver is in the second mode.

With the wireless receiving device according to the ninth aspect, it is possible to further reduce power consumption.

In accordance with a tenth aspect of the present invention, a wireless receiving device for a human powered vehicle, comprises a receiver and a controller. The receiver is configured to wirelessly receive a radio wave including a communication signal to communicate with a component of the human powered vehicle. The receiver is configured to execute at least one of operation modes including at least one of a first mode, a second mode in which the receiver consumes less electric power than in the first mode, and an additional second mode in which the receiver consumes less electric power than in the first mode and consumes more electric power than in the second mode. A sensitivity of the receiver in the additional second mode is higher than a sensitivity of the receiver in the second mode. The controller is configured to set the receiver with the additional second mode if a sensor detects information regarding an operational state of the human powered vehicle in a second-mode period during which the receiver operates in the second mode. The controller is configured to set the receiver with the first mode if the receiver receives the communication signal in an additional second mode.

With the wireless receiving device according to the tenth aspect, it is possible to further reduce power consumption, because the wireless receiving device can detect less noise signals due to change of the sensitivity when the wireless receiving device is located in a bad electromagnetic (EM) environment.

In accordance with a eleventh aspect of the present invention, the wireless receiving device according to the tenth aspect is configured so that the controller is configured to set the receiver with the second mode after a second lapse time passes since the controller starts controlling the receiver to operate in the additional second mode.

With the wireless receiving device according to the eleventh aspect, it is possible to further reduce power consumption, because the wireless receiving device can detect less noise signals due to change of the sensitivity when the wireless receiving device is located in a bad electromagnetic (EM) environment.

In accordance with a twelfth aspect of the present invention, the wireless receiving device according to the tenth or eleventh aspect is configured so that the receiver is configured to receive the radio wave in an awake period. The receiver is configured not to receive the radio wave in a sleep period. The awake period and the sleep period occur while the receiver is in the additional second mode.

With the wireless receiving device according to the twelfth aspect, it is possible to further reduce power consumption, because the wireless receiving device can detect less noise signals due to change of the sensitivity when the wireless receiving device is located in a bad electromagnetic (EM) environment.

In accordance with a thirteenth aspect of the present invention, the wireless receiving device according to any one of the first to twelfth aspects is configured so that the controller is configured to set the receiver with the second mode if the receiver does not receive the communication signal and a sensor does not detect information regarding an operational state of the human powered vehicle in the first-mode period. The controller is configured to control the receiver to continue operating in the first mode while the sensor detects information in the first-mode period.

With the wireless receiving device according to the thirteenth aspect, it is possible to further reduce power consumption, because an operation mode of the wireless receiving device is changed to the second mode immediately after the sensor detects a state in which the human powered vehicle is not operated.

In accordance with a fourteenth aspect of the present invention, the wireless receiving device according to any one of the first to thirteenth aspects is configured so that the operation modes further include a third mode in which the receiver consumes less electric power than in the second mode. The controller is configured to set the receiver with the third mode if a third lapse time passes since the controller starts controlling the receiver to operate in the second mode. The controller is configured to control the receiver to continue operating in the third mode until an additional release condition is satisfied while the receiver operates in the third mode.

With the wireless receiving device according to the fourteenth aspect, it is possible to further reduce power consumption.

In accordance with a fifteenth aspect of the present invention, the wireless receiving device according to the fourteenth aspect is configured so that the receiver is configured to receive the radio wave in an awake period. The receiver is configured not to receive the radio wave in a sleep period. An entire period during which the receiver is in the third mode is the sleep period.

With the wireless receiving device according to the fifteenth aspect, it is possible to further reduce power consumption.

In accordance with a sixteenth aspect of the present invention, the wireless receiving device according to the fourteenth or fifteenth aspect is configured so that the additional release condition is a condition in which a release mechanism is manipulated when the receiver operates in the third mode.

With the wireless receiving device according to the sixteenth aspect, it is possible to further reduce power consumption.

In accordance with a seventeenth aspect of the present invention, the wireless receiving device according to the fourteenth or fifteenth aspect is configured so that the additional release condition is a condition in which a sensor detects information regarding an operational state of the human powered vehicle when the receiver operates in the third mode.

With the wireless receiving device according to the seventeenth aspect, it is possible to reduce a user's operation to enable the receiver to operate in the first mode.

In accordance with an eighteenth aspect of the present invention, the wireless receiving device according to any one of the first to seventeenth aspects is configured so that the controller is configured to set the receiver with the first mode if the receiver receives the communication signal in the second mode.

With the wireless receiving device according to the eighteenth aspect, it is possible to smoothly start communication between the wireless receiving device and a wireless transmitting device (e.g. an operating device).

In accordance with a nineteen aspect of the present invention, a wireless receiving device for a human powered vehicle comprises a receiver and a controller. The receiver is configured to wirelessly receive a radio wave including a communication signal to communicate with a component of the human powered vehicle. The receiver is configured to execute at least one of operating modes including a first mode, and a third mode in which the receiver consumes less electric power than in the first mode. The controller is configured to control the receiver to continue operating in the third mode until an additional release condition is satisfied. The controller is configured to set the receiver with the first mode after the additional release condition is satisfied while the receiver operates in the third mode.

With the wireless receiving device according to the nineteenth aspect, it is possible to reduce power consumption.

In accordance with a nineteenth aspect of the present invention, the wireless receiving device according to the eighteenth aspect is configured so that the release condition is a condition in which a release mechanism is manipulated.

With the wireless receiving device according to the nineteenth aspect, it is possible to further reduce power consumption.

In accordance with a twentieth aspect of the present invention, the wireless receiving device according to the nineteenth aspect is configured so that the receiver is configured to receive the radio wave in an awake period. The receiver is configured not to receive the radio wave in a sleep period. A period during which the receiver is in the first mode is the awake mode. An entire period during which the receiver is in the third mode is the sleep period.

With the wireless receiving device according to the twentieth aspect, it is possible to further reduce power consumption.

In accordance with a twenty-first aspect of the present invention, the wireless receiving device according to the nineteenth or twentieth aspect is configured so that the additional release condition is a condition in which a release mechanism is manipulated.

With the wireless receiving device according to the twenty-first aspect, it is possible to further reduce power consumption.

In accordance with a twenty-second aspect of the present invention, the wireless receiving device according to any one of the sixth, the sixteenth, and the twenty-first aspect is configured so that the release mechanism includes an indicator. The controller is configured to control the indicator to indicate an operational state of the human powered vehicle if a sensor detects information regarding the operational state of the human powered vehicle.

With the wireless receiving device according to the twenty-second aspect, the indicator shows the operational state. Accordingly, it facilitates operation of the release mechanism.

In accordance with a twenty-third aspect of the present invention, the wireless receiving device according to the twenty-second aspect is configured so that the indicator includes at least one of a light emitter, a speaker, and a vibrator.

With the wireless receiving device according to the twenty-third aspect, it facilitates notification of the operation state to a user via at least one of vision, audition, and taction.

In accordance with a twenty-fourth aspect of the present invention, the wireless receiving device according to the nineteenth or twentieth aspect is configured so that the additional release condition is a condition in which a sensor detects information regarding an operational state of the human powered vehicle.

With the wireless receiving device according to the twenty-fourth aspect, it is possible to reduce a user's operation to enable the receiver to operate in the first mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 16 is a timing chart of the first and the third mode of the wireless receiving device illustrated in FIG. 15 in accordance with the third embodiment.

DESCRIPTION OF THE EMBODIMENTS

Figure 1:
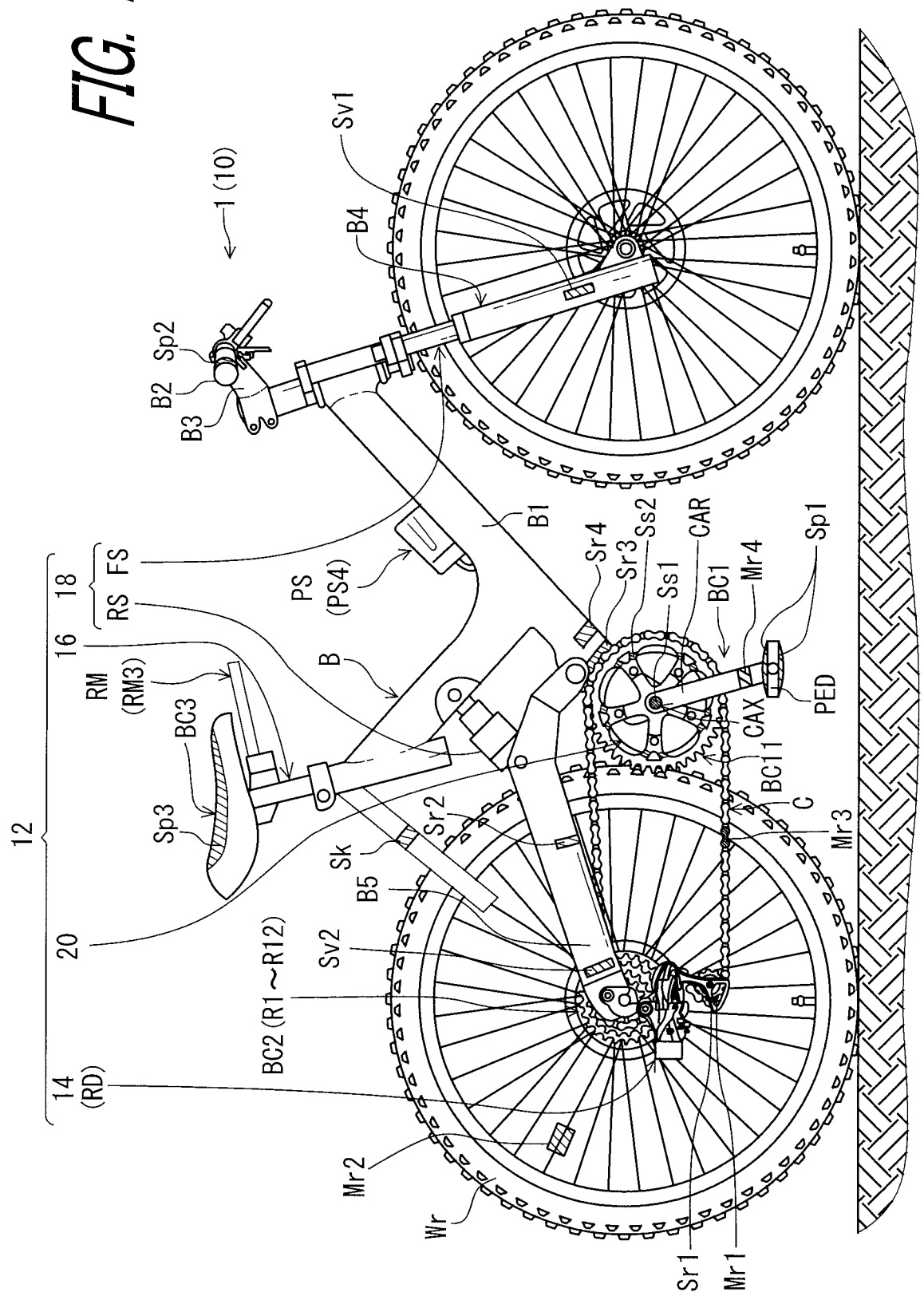
FIG. 1 is a side elevational view of a bicycle provided with a wireless receiving device.

The embodiments will now be described with reference to the accompanying drawings, wherein like reference numerals designate corresponding or identical elements throughout the various drawings.

First Embodiment

Referring initially to FIG. 1, a bicycle 10 as an example of a human powered vehicle 1 includes a wireless receiving device 12. The human powered vehicle 1 is a vehicle to travel with a motive power including at least a human power of a rider who rides the human powered vehicle 1. The human powered vehicle 1 has an arbitrary number of wheels. For example, the human powered vehicle 1 has either one, two, three, four, or more than five wheels. In this embodiment, the human powered vehicle 1 has a smaller size than that of a four-wheeled automobile, but the human powered vehicle 1 can have an arbitrary size. For example, the human powered vehicle 1 can be larger than the four-wheeled automobile. The human powered vehicles 1 include the bicycle 10, a tricycle, and a kick scooter. While the bicycle 10 is illustrated as a mountain bike, the wireless receiving device 12 can be applied to a road bike or any type of bicycle.

The wireless receiving device 12 comprises at least one of a derailleur (a bicycle rear derailleur RD) 14, an adjustable seatpost 16, a suspension (an electric front suspension FS, an electric rear suspension RS) 18, and an auxiliary drive unit

20. However, the wireless receiving device 12 can include another electric device such as an electric internal hub transmission, an electric continuously variable transmission, and an electric gearbox.

As seen in FIG. 1, the bicycle 10 includes a bicycle body B, a crank assembly BC1, a rear sprocket assembly BC2, a saddle BC3, and a bicycle chain C. The bicycle body B includes a bicycle frame B1, a handlebar B2, a stem B3, a front fork B4, and a rear swing arm B5. The handlebar B2 is coupled to the front fork B4 with the stem B3. The electric front suspension FS is mounted to the front fork B4. The electric rear suspension RS couples the bicycle frame B1 to the rear swing arm B5. The saddle BC3 is attached to the adjustable seatpost 16. The adjustable seatpost 16 is mounted to the bicycle body B to change a position of the saddle BC3 relative to the bicycle body B.

The bicycle chain C engages with a front sprocket BC11 of the crank assembly BC1 and the rear sprocket assembly BC2. The derailleur 14 (the bicycle rear derailleur RD) shifts the bicycle chain C relative to the rear sprocket assembly BC2 to change a speed stage. In the illustrated embodiment, the front sprocket BC11 is a single (solitary) sprocket in the crank assembly BC1 while the rear sprocket assembly BC2 has twelve speed stages. However, the crank assembly BC1 can include a plurality of front sprockets. In such an embodiment, the bicycle 10 includes, as the derailleur 14, a front derailleur configured to shift the bicycle chain C relative to the plurality of front sprockets.

The bicycle 10 includes the auxiliary drive unit 20 mounted to the bicycle body B to assist pedaling. The auxiliary drive unit 20 is configured to generate an auxiliary drive force in accordance with a pedaling torque. The auxiliary drive unit 20 is coupled to the crank assembly BC1 to transmit the auxiliary drive force to the crank assembly BC1. The auxiliary drive unit 20 can be omitted from the wireless receiving device 12.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 with facing the handlebar B2. Accordingly, these terms, as utilized to describe the wireless receiving device 12, should be interpreted relative to the bicycle 10 equipped with the wireless receiving device 12 as used in an upright riding position on a horizontal surface.

As seen in FIG. 1, the rear sprocket assembly BC2 includes first to twelfth rear sprockets R1 to R12. Each of the first to twelfth rear sprockets R1 to R12 has a different total number of teeth. A total number of the rear sprockets R1 to R12 is not limited to this embodiment. The first rear sprocket R1 has the largest number of teeth in the rear sprocket assembly BC2. The twelfth rear sprocket R12 has the smallest number of teeth in the rear sprocket assembly BC2. The first rear sprocket R1 corresponds to low gear. The twelfth rear sprocket R12 corresponds to top gear. The wireless receiving device 12 is configured to shift the bicycle chain C relative to the first to twelfth rear sprockets R1 to R12 to change a gear stage of the bicycle 10.

Bicycle Electric Operating Device

Figure 2:
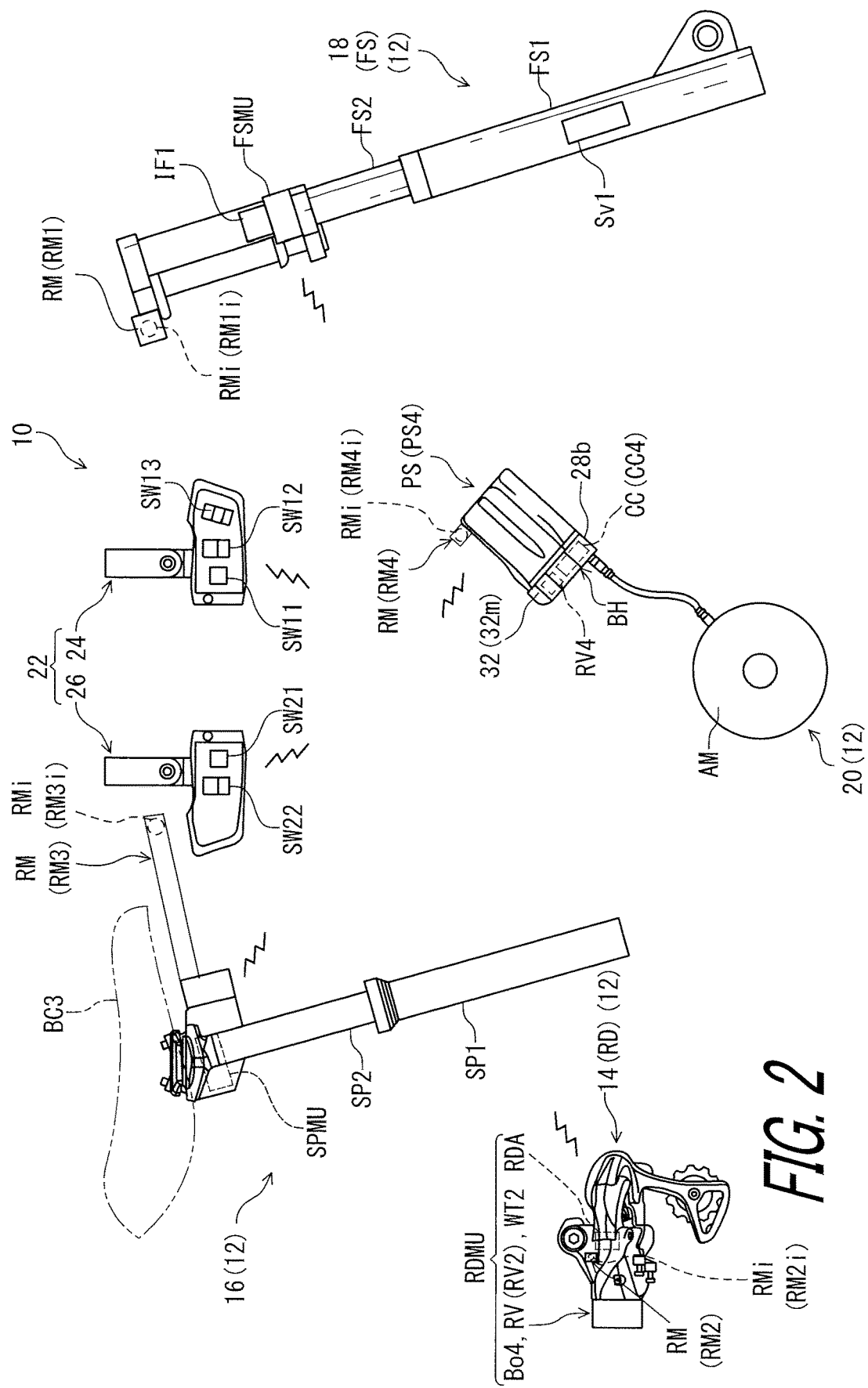
FIG. 2 is a diagrammatic view of the wireless receiving device and a bicycle electric operating device illustrated in FIG. 1.

As seen in FIG. 2, the bicycle 10 comprises a bicycle electric operating device 22. The bicycle electric operating device 22 is mounted to the handlebar B2 (FIG. 1). The bicycle electric operating device 22 includes a first operating device 24 and a second operating device 26. The first operating device 24 and the second operating device 26 are mounted to the handlebar B2 (FIG. 1). The first operating device 24 is a right-hand control device. The second operating device 26 is a left-hand control device. However, the bicycle electric operating device 22 can include another operating device instead of or in addition to the first operating device 24 and the second operating device 26. One of the first operating device 24 and the second operating device 26 can be omitted from the bicycle electric operating device 22.

In this embodiment, the bicycle electric operating device 22 is wirelessly connected to the wireless receiving device 12. More specifically, the first operating device 24 and the second operating device 26 are wirelessly connected to at least one of the derailleur 14, the adjustable seatpost 16, the suspension 18, and the auxiliary drive unit 20. In FIG. 2, only the bicycle rear derailleur RD is illustrated as the derailleur 14, and only the electric front suspension FS is illustrated as the suspension 18. However, the electric rear suspension RS is also wirelessly connected to the bicycle electric operating device 22, and a front derailleur, which is not illustrated, can be wirelessly connected to the bicycle electric operating device 22.

Figure 3:
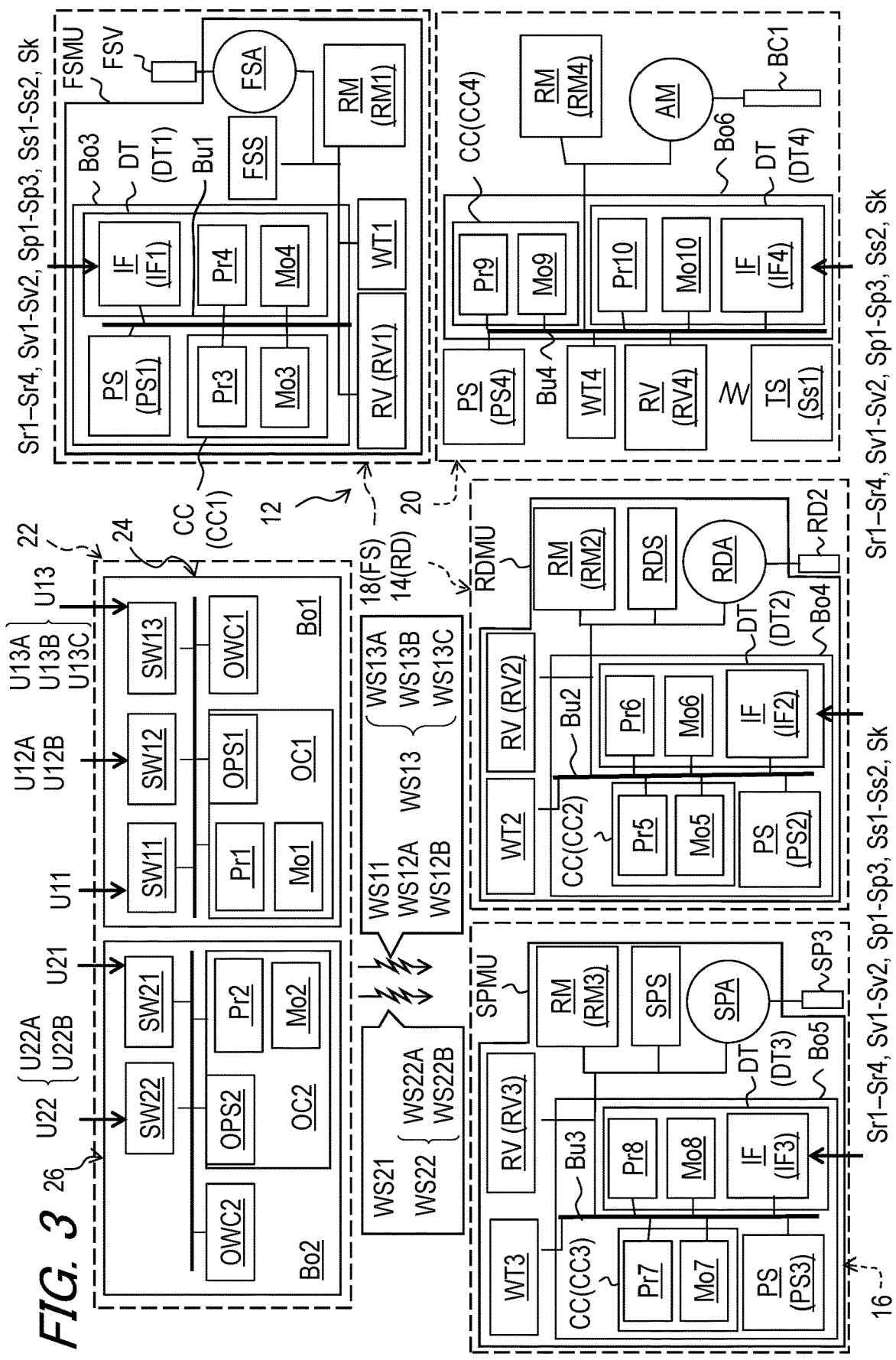
FIG. 3 is a schematic block diagram of the wireless receiving device and the bicycle electric operating device illustrated in FIG. 1.

As seen in FIG. 3, the first operating device 24 is configured to receive an upshift user input U11 from the user. The second operating device 26 is configured to receive a downshift user input U21 from the user. The first operating device 24 is configured to wirelessly transmit an upshift control signal WS11 to the wireless receiving device 12 in response to the upshift user input U11. The second operating device 26 is configured to wirelessly transmit a downshift control signal WS21 to the wireless receiving device 12 in response to the downshift user input U21. More specifically, the upshift control signal WS11 and the downshift control signal WS21 are transmitted to the derailleur 14 (the bicycle rear derailleur RD).

The first operating device 24 is configured to receive an unlock user input U12A and a lock user input U12B. The first operating device 24 is configured to wirelessly transmit an unlock control signal WS12A to the suspension 18 (the wireless receiving device 12) in response to the unlock user input U12A. The first operating device 24 is configured to wirelessly transmit a lock control signal WS12B to the suspension 18 (the wireless receiving device 12) in response to the lock user input U12B. The suspension 18 has an unlocked state and a locked state and changes a state between the unlocked state and the locked state based on the unlock control signal WS12A and the lock control signal WS12B.

The first operating device 24 is configured to receive an assist user input U13. The assist user input U13 includes a first-mode user input U13A, a second-mode user input U13B, and a third-mode user input U13C. The first operating device 24 is configured to wirelessly transmit a first-mode control signal WS13A to the auxiliary drive unit 20 (the wireless receiving device 12) in response to the first-mode user input U13A. The first operating device 24 is configured to wirelessly transmit a second-mode control signal WS13B to the auxiliary drive unit 20 (the wireless receiving device 12) in response to the second-mode user input U13B. The first operating device 24 is configured to wirelessly transmit a third-mode control signal WS13C to the auxiliary drive unit 20 (the wireless receiving device 12) in response to the third-mode user input U13C.

The second operating device 26 is configured to receive a seatpost user input U22. The seatpost user input U22 includes a first seatpost user input U22A and a second seatpost user input U22B. The second operating device 26 is configured to wirelessly transmit a first seatpost control signal WS22A to the adjustable seatpost 16 (the wireless receiving device 12) in response to the first seatpost user input U22A. The second operating device 26 is configured to wirelessly transmit a second seatpost control signal WS22B to the adjustable seatpost 16 (the wireless receiving device 12) in response to the second seatpost user input U22B. The adjustable seatpost 16 shortens an overall length based on the first seatpost control signal WS22A. The adjustable seatpost 16 lengthens the overall length based on the second seatpost control signal WS22B.

As seen in FIG. 3, the first operating device 24 includes an upshift switch SW11, a lock operation switch SW12, an assist operation switch SW13, a first operation controller ° CI, a first operation wireless communicator OWC1, and a first circuit board Bo1. The upshift switch SW11, the lock operation switch SW12, the assist operation switch SW13, the first operation controller OC1, and the first operation wireless communicator OWC1 are electrically mounted on the first circuit board Bo1. The upshift switch SW11 is configured to receive the upshift user input U11 from the user. The lock operation switch SW12 is configured to receive the unlock user input U12A and the lock user input U12B from the user. The assist operation switch SW13 is configured to receive the assist user input U13 from the user. For example, as seen in FIG. 2, the upshift switch SW11 includes a push-button switch. The lock operation switch SW12 includes two-position switch having two positions corresponding to the unlock user input U12A and the lock user input U12B. The assist operation switch SW13 includes a three-position switch having three positions corresponding to the first-mode to third-mode user input U13A to U13C.

The first operation controller OC1 is electrically connected to the upshift switch SW11 to generate the upshift control signal WS11 in response to the upshift user input U11 received by the upshift switch SW11. The first operation controller OC1 is electrically connected to the lock operation switch SW12 to generate the unlock control signal WS12A in response to the unlock user input U12A received by the lock operation switch SW12. The first operation controller OC1 is electrically connected to the lock operation switch SW12 to generate the lock control signal WS12B in response to the lock user input U12B received by the lock operation switch SW12.

The first operation controller OC1 is electrically connected to the assist operation switch SW13 to generate an assist control signal WS13 in response to the assist user input U13 received by the assist operation switch SW13. Specifically, the first operation controller OC1 is configured to generate the first-mode control signal WS13A in response to the first-mode user input U13A received by the assist operation switch SW13. The first operation controller OC1 is configured to generate the second-mode control signal WS13B in response to the second-mode user input U13B received by the assist operation switch SW13. The first operation controller OC1 is configured to generate the third-mode control signal WS13C in response to the third-mode user input U13C received by the assist operation switch SW13.

In this embodiment, the first operation controller OC1 includes a processor Pr1, a memory Mo1, and a first operation controller power supply OPS1. The processor Pr1 and the memory Mo1 are electrically mounted on the first circuit board Bo1. The processor Pr1 includes a central processing unit (CPU) and a memory controller. The memory Mo1 is electrically connected to the processor Pr1. The memory Mo1 includes a read only memory (ROM) and a random-access memory (RAM). The ROM includes a non-transitory computer-readable storage medium. The RAM includes a transitory computer-readable storage medium. The memory Mo1 includes storage areas each having an address in the ROM and the RAM. The processor Pr1 controls the memory Mo1 to store data in the storage areas of the memory Mo1 and reads data from the storage areas of the memory Mo1. The memory Mo1 (e.g., the ROM) stores a program. The program is read into the processor Pr1, and thereby functions of the first operation controller OC1 is performed.

The memory Mo1 stores identification information ID11 of the first operating device 24. The identification information ID11 of the first operating device 24 includes a unique device identifier (ID) (e.g., a value indicative of a shift operating device) of the first operating device 24. The identification information ID11 of the first operating device 24 further includes a value indicative of a device type such as "right-hand side" or "left-hand side."

The first operation controller power supply OPS1 is electrically connected to the first operation controller OC1, the upshift switch SW11, the lock operation switch SW12, the assist operation switch SW13, and the first operation wireless communicator OWC1 to supply electricity to the first operation controller OC1, the upshift switch SW11, the lock operation switch SW12, the assist operation switch SW13, and the first operation wireless communicator OWC1. The first operation controller power supply OPS1 can include a primary battery such as a lithium manganese dioxide battery and a secondary battery such as a lithium-ion secondary battery. However, the first operation controller power supply OPS1 can include an electricity generation element configured to generate the electricity using pressure and/or vibration caused by an operation of the upshift switch SW11, the lock operation switch SW12, the assist operation switch SW13. In this embodiment, the first operation controller power supply OPS1 includes a primary button battery.

The first operation wireless communicator OWC1 includes a signal transmitting circuit, a signal receiving circuit, and an antenna. Thus, the first operation wireless communicator OWC1 can also be referred to as a first operation wireless communication circuit or circuitry OWC1. The first operation wireless communicator OWC1 is electrically connected to the first operation controller OC1 to wirelessly transmit the upshift control signal WS11, the unlock control signal WS12A, the lock control signal WS12B, and the first-mode to third-mode control signals WS13A to WS13C to the wireless receiving device 12 (the derailleur 14, the suspension 18, and the auxiliary drive unit 20). The first operation wireless communicator OWC1 is configured to wirelessly transmit the upshift control signal WS11, the unlock control signal WS12A, the lock control signal WS12B, and the first-mode to third-mode control signals WS13A to WS13C including the identification information ID11. The first operation wireless communicator OWC1 can be configured to superimpose the upshift control signal WS11, the unlock control signal WS12A, the lock control signal WS12B, and the first-mode to third-mode control signals WS13A to WS13C on carrier wave using a predetermined wireless communication protocol.

As seen in FIG. 3, the second operating device 26 includes a downshift switch SW21, a seatpost operation switch SW22, a second operation controller OC2, a second operation wireless communicator OWC2, and a second circuit board Bo2. The downshift switch SW21, the seatpost operation switch SW22, the second operation controller OC2, and the second operation wireless communicator OWC2 are electrically mounted on the second circuit board Bo2. The downshift switch SW21 is configured to receive the downshift user input U21 from the user. The seatpost operation switch SW22 is configured to receive the seatpost user input U22 from the user. For example, as seen in FIG. 2, the downshift switch SW21 includes a push-button switch. The seatpost operation switch SW22 includes a two-position switch having two positions corresponding to the first and second seatpost user inputs U22A and U22B.

The second operation controller OC2 is electrically connected to the downshift switch SW21 to generate the downshift control signal WS21 in response to the downshift user input U21 received by the downshift switch SW21. The second operation controller OC2 is electrically connected to the seatpost operation switch SW22 to generate a seatpost control signal WS22 in response to the seatpost user input U22 received by the seatpost operation switch SW22. Specifically, the second operation controller OC2 is configured to generate the first seatpost control signal WS22A in response to the first seatpost user input U22A received by the seatpost operation switch SW22. The second operation controller OC2 is configured to generate the second seatpost control signal WS22B in response to the second seatpost user input U22B received by the seatpost operation switch SW22.

In this embodiment, the second operation controller OC2 includes a processor Pr2, a memory Mo2, and a second operation controller power supply OPS2. The processor Pr2 and the memory Mo2 are electrically mounted on the second circuit board Bo2. The processor Pr2 includes a CPU and a memory controller. The memory Mo2 is electrically connected to the processor Pr2. The memory Mo2 includes a ROM and a RAM. The ROM includes a non-transitory computer-readable storage medium. The RAM includes a transitory computer-readable storage medium. The memory Mo2 includes storage areas each having an address in the ROM and the RAM. The processor Pr2 controls the memory Mo2 to store data in the storage areas of the memory Mo2 and reads data from the storage areas of the memory Mo2. The memory Mo2 (e.g., the ROM) stores a program. The program is read into the processor Pr2, and thereby functions of the second operation controller OC2 is performed.

The memory Mo2 stores identification information ID12 of the second operating device 26. The identification information ID12 of the second operating device 26 includes a unique device identifier (ID) (e.g., a value indicative of a shift operating device) of the second operating device 26. The identification information ID12 of the second operating device 26 further includes a value indicative of a device type such as "right-hand side" or "left-hand side."

The second operation controller power supply OPS2 is electrically connected to the second operation controller OC2, the downshift switch SW21, the seatpost operation switch SW22, and the second operation wireless communicator OWC2 to supply electricity to the second operation controller OC2, the downshift switch SW21, the seatpost operation switch SW22, and the second operation wireless communicator OWC2. The second operation controller power supply OPS2 can include a primary battery such as a lithium manganese dioxide battery, and a secondary battery such as a lithium-ion secondary battery. However, the second operation controller power supply OPS2 can include an electricity generation element configured to generate the electricity using pressure and/or vibration caused by an operation of the downshift switch SW21 and the seatpost operation switch SW22. In this embodiment, the second operation controller power supply OPS2 includes a primary button battery.

The second operation wireless communicator OWC2 includes a signal transmitting circuit, a signal receiving circuit, and an antenna. Thus, the second operation wireless communicator OWC2 can also be referred to as a second operation wireless communication circuit or circuitry OWC2. The second operation wireless communicator OWC2 is electrically connected to the second operation controller OC2 to wirelessly transmit the downshift control signal WS21 and the seatpost control signal WS22 to the wireless receiving device 12 (the derailleur 14 and the adjustable seatpost 16). The second operation wireless communicator OWC2 is configured to wirelessly transmit the downshift control signal WS21 and the seatpost control signal WS22 including the identification information ID12. The second operation wireless communicator OWC2 can be configured to superimpose the downshift control signal WS21 and the seatpost control signal WS22 on carrier wave using a predetermined wireless communication protocol.

Suspension

Figure 4:
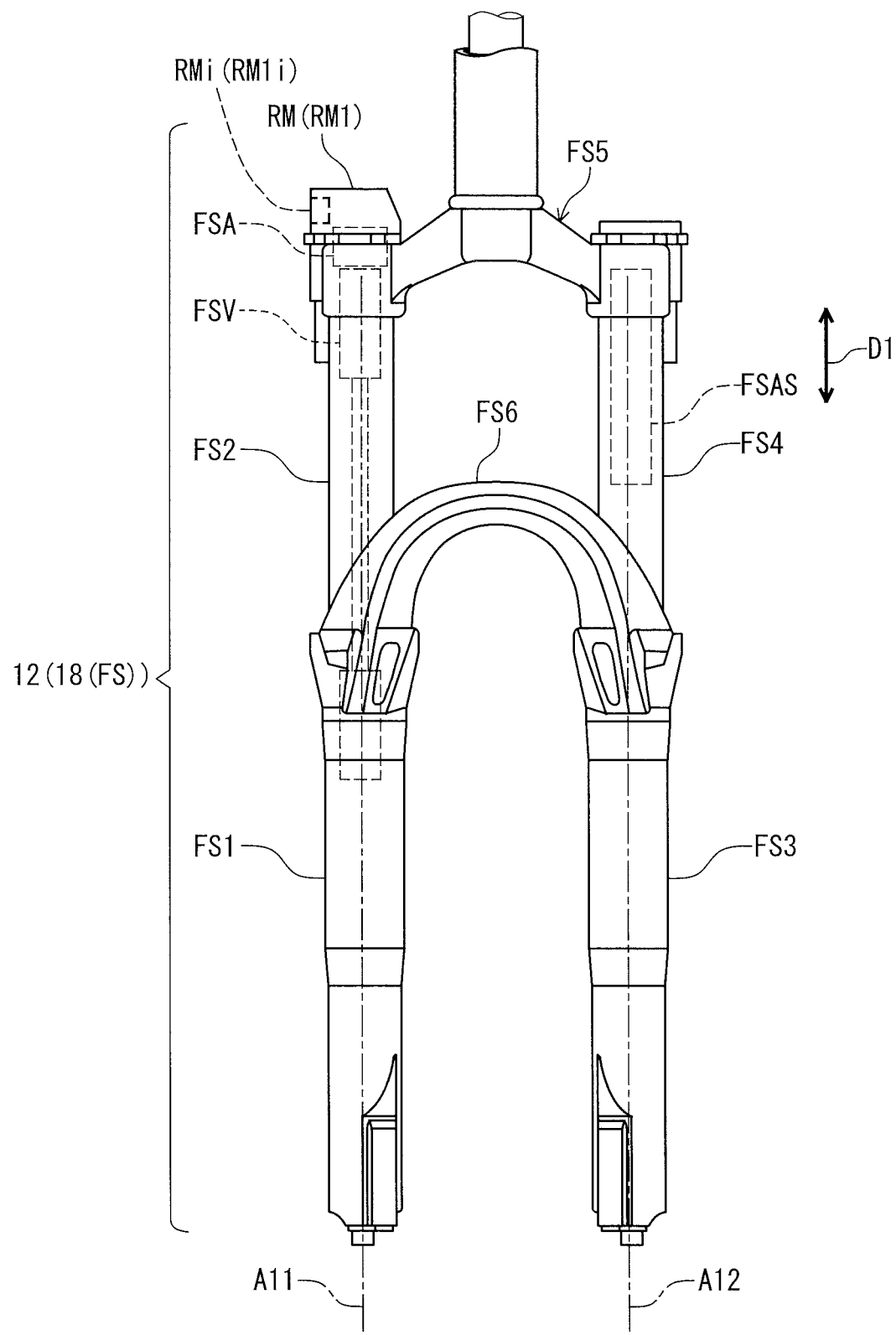
FIG. 4 is a front view of the wireless receiving device (an electric front suspension) illustrated in FIG. 1.

As seen in FIG. 4, the electric front suspension FS includes a first suspension tube FS1, a second suspension tube FS2, a valve structure FSV, and a first electric actuator FSA. The first suspension tube FS1 has a center axis A11. The second suspension tube FS2 is telescopically received in the first suspension tube FS1. The valve structure FSV is configured to change the damping characteristic of the electric front suspension FS. The first electric actuator FSA is coupled to the valve structure FSV to actuate the valve structure FSV. The first electric actuator FSA is mounted on an upper end of the second suspension tube FS2. However, the first electric actuator FSA can be provided at other positions.

In this embodiment, the electric front suspension FS has the unlocked state and the locked state. The valve structure FSV at least changes a state of the electric front suspension FS between the unlocked state and the locked state. In the locked state of the valve structure FSV, the first suspension tube FS1 is locked relative to the second suspension tube FS2 in the telescopic direction D1. However, the first suspension tube FS1 can be slightly moved in the locked state of the valve structure FSV, when a large shock from terrain is applied to the electric front suspension FS. For example, a fluid passageway (not shown) of the valve structure FSV is closed by a valve (not shown) of the valve structure FSV in the locked state. In the unlocked state of the valve structure FSV, the first suspension tube FS1 and the second suspension tube FS2 are movable relative to each other in the telescopic direction D1 to absorb shocks from rough terrain. For example, the fluid passageway (not shown) of the valve structure FSV is released by the valve (not shown) of the valve structure FSV in the unlocked state. The first electric actuator FSA is operatively coupled to the valve structure FSV to change a state of the valve structure FSV between the unlocked state and the locked state. Valve structures for bicycle suspensions are well known in the bicycle field. Thus, the valve structure FSV can be any type of suitable lockout device as needed and/or desired.

The electric front suspension FS can have an intermediate state between the unlocked state and the locked state. For example, a cross section of the fluid passageway (not shown) at the valve (not shown) in the intermediate state is smaller than a cross section of the fluid passageway (not shown) at the valve (not shown) in the unlocked state.

Similarly, the electric front suspension FS comprises a third suspension tube FS3, a fourth suspension tube FS4, and a stroke adjustment structure FSAS. The third suspension tube FS3 has a center axis A12. The fourth suspension tube FS4 is telescopically received in the third suspension tube FS3.

In this embodiment, the stroke adjustment structure FSAS is configured to change a stroke of the electric front suspension FS. The stroke adjustment structure FSAS is configured to change a relative position of the third suspension tube FS3 and the fourth suspension tube FS4 between a long-stroke position and a short-stroke position in the telescopic direction D1. The stroke adjustment structure FSAS is manually operated by the user to change the resistance. Stroke adjustment devices for bicycle suspensions are well known in the bicycle field. Thus, the stroke adjustment structure FSAS can be any type of suitable stroke adjustment device as needed and/or desired.

The second and fourth suspension tubes FS2 and FS4 are coupled to a crown FS5. The first suspension tube FS1 is coupled to the third suspension tube FS3 with a coupling arm FS6. The first and third suspension tubes FS1 and FS3 are integrally movable relative to the second and fourth suspension tubes FS2 and FS4 to absorb shocks. In the unlocked state of the valve structure FSV, the first suspension tube FS1 and the third suspension tube FS3 are respectively movable relative to the second suspension tube FS2 and the fourth suspension tube FS4 in the telescopic direction D1 to absorb shocks from rough terrain.

As seen in FIG. 3, the suspension 18 (the electric front suspension FS) further includes a valve position sensor FSS. The valve position sensor FSS is configured to sense the state of the valve structure FSV with the first electric actuator FSA. In this embodiment, the valve position sensor FSS is a contact rotational position sensor such as a potentiometer. The valve position sensor FSS is configured to sense an absolute rotational position of the rotational shaft of the first electric actuator FSA as the state of the valve structure FSV. Other examples of the valve position sensor FSS include a non-contact rotational position sensor such as an optical sensor (e.g., a rotary encoder) and a magnetic sensor (e.g., a hall sensor).

The wireless receiving device 12 (the suspension 18 (the electric front suspension FS)) comprises a receiver RV configured to receive a radio wave including a communication signal WS12A, WS12B to communicate a component of the human powered vehicle 1 (the suspension 18 (the electric front suspension FS)). In the following description, the radio wave includes a wireless signal, and an electromagnetic wave emitted from home appliances. In addition, the receiver RV of the electric front suspension FS is specifically referred to as a first receiver RV1. The wireless receiving device 12 (the suspension 18 (the electric front suspension FS)) comprises a controller CC. In the following description, the controller CC of the electric front suspension FS is specifically referred to as a first bicycle component controller CC1. The first electric actuator FSA, the valve position sensor FSS, and the first receiver RV1 are electrically connected to the first bicycle component controller CC1.

The first bicycle component controller CC1 is configured to control the first electric actuator FSA based on the unlock control signal WS12A and the lock control signal WS12B transmitted from the bicycle electric operating device 22 via the first receiver RV1 as well as the position sensed by the valve position sensor FSS. Specifically, the first bicycle component controller CC1 is configured to control the first electric actuator FSA to open the fluid passageway of the valve structure FSV to change the state of the valve structure FSV to the unlocked state based on the sensed position and the unlock control signal WS12A. The first controller CR1 is configured to control the first electric actuator FSA to close the fluid passageway of the valve structure FSV to change the state of the valve structure FSV to the locked state based on the sensed position and the lock control signal WS12B.

As seen in FIG. 3, the first bicycle component controller CC1 is constituted as a microcomputer and includes a processor Pr3 and a memory Mo3. The processor Pr3 includes a CPU and a memory controller. The memory Mo3 includes a ROM and a RAM. The ROM includes a non-transitory computer-readable storage medium. The RAM includes a transitory computer-readable storage medium. The memory Mo3 includes storage areas each having an address in the ROM and the RAM. The processor Pr3 is configured to control the memory Mo3 to store data in the storage areas of the memory Mo3 and to read data from the storage areas of the memory Mo3.

At least one program is stored in the memory Mo3 (e.g., the ROM). The at least one program is read into the processor Pr3, and thereby functions of the first bicycle component controller CC1 are performed. The processor Pr3 and the memory Mo3 are mounted on a circuit board Bo3 and are connected to each other with the bus Bu1. The first bicycle component controller CC1 can also be referred to as a first bicycle component control circuit or circuitry CC1.

Further, the wireless receiving device 12 (the suspension 18 (the electric front suspension FS)) comprises a detector DT to detect an operational state of the bicycle 10. In the following description, the detector DT of the electric front suspension FS is specifically referred to as a first detector DT1. As seen in FIGS. 1 and 3, the detector DT includes at least one of a vibration sensor Sv1, Sv2, a pressure sensor Sp1, Sp2, Sp3, a rotation sensor Sr1, Sr2, Sr3, Sr4, a strain sensor Ss1, Ss2, and a bicycle lock-state sensor Sk. As seen in. FIG. 3, the detector DT further includes an input interface IF through which an output signal from the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk is inputted via the receiver RV or an electric cable connected to the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the first detector DT1 is specifically referred to as a first input interface IF1.

The vibration sensors Sv1 and Sv2 are typically acceleration sensors. For example, as seen in FIG. 1, the vibration sensors Sv1 and Sv2 are mounted to the electric front suspension FS and the rear swing arm B5, respectively. However, at least one of the vibration sensors Sv1 and Sv2 can be mounted to other positions than the electric front suspension FS and the rear swing arm B5 such as the third suspension tube FS3 and the bicycle body B. The vibration sensors Sv1 and Sv2 are configured to detect acceleration applied to the bicycle 10. Typically, the vibration sensor Sv1 is connected to the first input interface IF1 via the electric cable and is configured to output a signal including an amount of the acceleration to the first detector DT1 via the electric cable. The vibration sensor Sv1 is also connected to a first wireless transmitter WT1 of the suspension 18 in order for the first wireless transmitter WT1 to transmit the signal from the vibration sensor Sv1 to another wireless receiving device 12. The vibration sensor Sv2 is connected to a second wireless transmitter WT2 (See FIG. 3) attached to the bicycle rear derailleur RD via an electric cable and is configured to output a signal including an amount of the acceleration to the detector DT (the first detector DT1) via wireless communication between the first receiver RV1 and the second wireless transmitter WT2. However, the vibration sensor Sv1 can output the signal to the first detector DT1 via wireless communication, and the vibration sensor Sv2 can output the signal to the detector DT (the first detector DT1) via wired communication.

The pressure sensor Sp1 is typically a strain gauge attached to a bicycle pedal PED. The pressure sensor Sp1 is configured to detect a strain amount in accordance with a pressure applied to the bicycle pedal PED. The pressure sensors Sp2 and Sp3 are typically film-shaped pressure sensors attached to the handlebar B2 and the saddle BC3, respectively. The pressure sensors Sp2 and Sp3 are configured to detect capacity changes in accordance with deformation of films of the pressure sensors Sp2 and Sp3 due to pressures applied to the handlebar B2 and the saddle BC3, respectively. However, the above description regarding the pressure sensors Sp1 to Sp3 is merely an example. The pressure sensors Sp1 to Sp3 may be different types of sensors to detect pressures applied to the bicycle pedal PED, the handlebar B2, and the saddle BC3, respectively. Typically, the pressure sensor Sp1 has a battery and a wireless transmitter to wirelessly transmit a signal including an amount of the pressure to the detector DT (the first detector DT1) via wireless communication between a wireless transmitter attached to the pressure sensor Sp1 and the first receiver RV1. The pressure sensor Sp2 is connected to at least one of the first operation wireless communicator OWC1 and the second operation wireless communicator OWC2 via an electric cable and is configured to output the signal to the detector DT (the first detector DT1) via wireless communication between the first receiver RV1 and the at least one of the first operation wireless communicator OWC1 and the second operation wireless communicator OWC2. The pressure sensor Sp3 is electrically connected to a third wireless transmitter WT3 (See FIG. 3) attached to the adjustable seatpost 16 and is configured to output a signal including an amount of the pressure to the detector DT (the first detector DT1) via wireless communication between the first receiver RV1 and the third wireless transmitter WT3. However, the pressure sensors Sp1 to Sp3 are connected to different wireless communicators. Alternatively, the pressure sensors Sp1 to Sp3 can output the signal to the detector DT (the first detector DT1) via wired communication.

Figure 5:
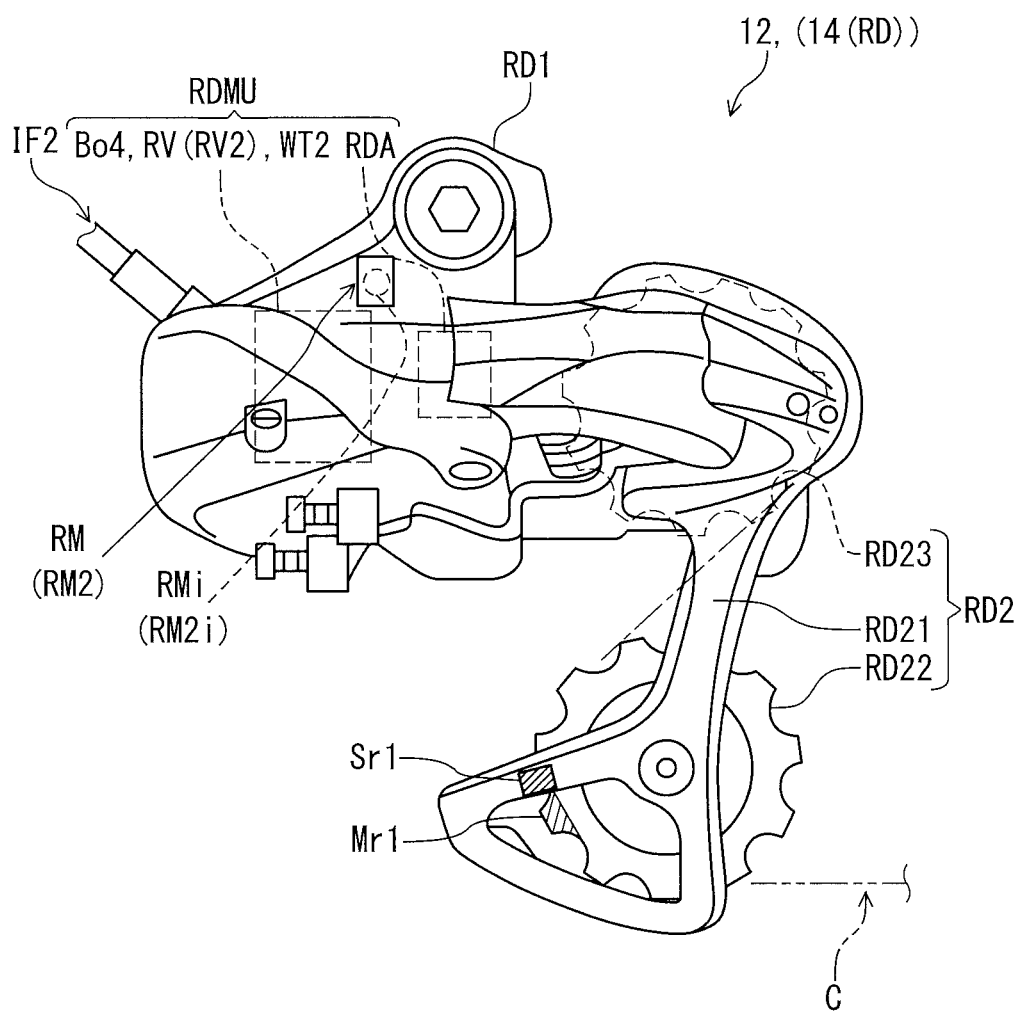
FIG. 5 is a side elevational view of the wireless receiving device (a rear derailleur) illustrated in FIG. 1.

The rotation sensors Sr1, Sr2, Sr3, and Sr4 are used with magnetized parts Mr1, Mr2, Mr3, and Mr4, respectively. For example, each of the magnetized parts Mr1, Mr2, Mr3, and Mr4 includes a permanent magnet. Each of the rotation sensors Sr1, Sr2, Sr3, and Sr4 includes a magnetic sensor. As shown in FIGS. 1 and 5, the magnetized part Mr1 is attached to a first pulley RD22, which is described below. The rotation sensor Sr1 is attached to a chain guide RD21, which will be described below. When the user pedals the bicycle 10, the first pulley RD22 rotates relative to the chain guide RD21. The magnetized part Ma passes through a sensing area of the rotation sensor Sr1 by each rotation of the first pulley RD22 so that the rotation sensor Sr1 senses the rotation of the first pulley RD22. The rotation sensor Sr1 is connected to the second wireless transmitter WT2 attached to the bicycle rear derailleur RD via an electric cable and is configured to output a signal indicating the rotation to the detector DT (the first detector DT1) via wireless communication between the first receiver RV1 and the second wireless transmitter WT2. However, the rotation sensor Sr1 can be connected to a different wireless communicator from the second wireless transmitter WT2. Alternatively, the rotation sensor Sr1 can output the signal to the detector DT (the first detector DT1) via wired communication.

As shown in FIG. 1, the magnetized part Mr2 is attached to a spoke of the rear wheel Wr. The rotation sensor Sr2 is attached to the rear swing arm B5. When the user pedals the bicycle 10, the rear wheel Wr rotates relative to the bicycle frame B1 (specifically, the rear swing arm B5). The magnetized part Mr2 passes through a sensing area of the rotation sensor Sr2 by each rotation of the rear wheel Wr so that the rotation sensor Sr2 senses the rotation of the rear wheel Wr. As shown in FIG. 1, the magnetized part Mr3 is attached to the bicycle chain C. The magnetized part Mr3 can be a magnetized link plate of the bicycle chain C. The rotation sensor Sr3 is attached to the bicycle frame B1 adjacent to an outer periphery of the front sprocket BC11. When the user pedals the bicycle 10, the bicycle chain C rotates relative to the bicycle frame B1. The magnetized part Mr3 passes through a sensing area of the rotation sensor Sr3 by each rotation of the bicycle chain C so that the rotation sensor Sr3 senses the rotation of the bicycle chain C. As shown in FIG. 1, the magnetized part Mr4 is attached to the crank assembly BC1. As shown in FIG. 1, the crank assembly BC1 includes crank arms CAR. The magnetized part Mr4 is attached to one of the crank arms CAR. The rotation sensor Sr4 is attached to bicycle frame B1. When the user pedals the bicycle 10, the crank assembly BC1 (specifically, the crank arms CAR) rotates relative to the bicycle frame B1. The magnetized part Mr4 passes through a sensing area of the rotation sensor Sr4 by each rotation of the crank arms CAR so that the rotation sensor Sr4 senses the rotation of the crank assembly BC1. Typically, the rotation sensors Sr2, Sr3, and Sr4 are connected to a fourth wireless transmitter WT4 (See FIG. 3) attached to the auxiliary drive unit 20 and is configured to output a signal indicating the rotation to the detector DT (the first detector DT1) via wireless communication between the first receiver RV1 and the fourth wireless transmitter WT4. However, at least one of the rotation sensors Sr2, Sr3, and Sr4 are connected to a different wireless communicator. Alternatively, at least one of the rotation sensors Sr2, Sr3, and Sr4 can output the signal to the detector DT (the first detector DT1) via wired communication.

The strain sensor Ss1 is typically a strain gauge attached to the crank assembly BC1. As shown in FIG. 1, the crank assembly BC1 includes a crank axle CAX connected to crank arms CAR. The strain sensor Ss1 is configured to detect a twist of the crank axle CAX due to the user's pedaling. The strain sensor Ss2 is typically a strain gauge attached to the front sprocket BC11. The strain sensor Ss2 is configured to detect a distortion of the front sprocket BC11 due to the user's pedaling. Each of the strain sensors Ss1 and Ss2 has a battery and a wireless communicator to wirelessly transmit its output signal to the first receiver RV1.

The bicycle lock-state sensor Sk is typically an electrical switch to transmit a signal when the bicycle is unlocked. For example, the bicycle lock-state sensor Sk is turned off when a latch passes through a space between the spokes of the rear wheel Wr, and the bicycle lock-state sensor Sk is turned on when the latch moves to an unlock position. Typically, the bicycle lock-state sensor Sk is connected to the fourth wireless transmitter WT4 attached to the auxiliary drive unit 20 and is configured to output the signal indicating the position of the latch to the detector DT (the first detector DT1) via wireless communication between the first receiver RV1 and the fourth wireless transmitter WT4. However, the bicycle lock-state sensor Sk is connected to a different wireless communicator. Alternatively, the bicycle lock-state sensor Sk can output the signal to the detector DT (the first detector DT1) via wired communication.

In this embodiment, the detector DT is configured to detect the operational state of the bicycle 10 based on the signal from the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. For example, the detector DT is configured to determine the operational state of the bicycle 10 when the detector DT detects the acceleration indicated by the signal from the at least one vibration sensor Sv1, Sv2 is over a vibration threshold which is predetermined. The detector DT can be configured to determine the non-operational state of the bicycle 10 when the detector DT detects the acceleration has been below the vibration threshold for a detection threshold time (e.g. a sampling time). The detector DT is configured to determine the operational state of the bicycle 10 when the detector DT detects the pressure that the signal indicated by the at least one pressure sensor Sp1, Sp2, Sp3 is over a pressure threshold which is predetermined. The detector DT can be configured to determine the non-operational state of the bicycle 10 when the detector DT detects the pressure has been below the pressure threshold for the detection threshold time. The detector DT is configured to determine the operational state of the bicycle 10 when the detector DT detects the strain amount that the signal indicated by the at least one strain sensor Ss1, Ss2 is over a strain threshold which is predetermined. The detector DT can be configured to determine the non-operational state of the bicycle 10 when the detector DT detects the strain amount has been below the strain threshold for the detection threshold time. The detector DT is configured to determine the operational state of the bicycle 10 when the detector DT detects the signal from the at least one rotation sensor Sr1, Sr2, Sr3, Sr4, which indicates at least one rotation is detected by the at least one rotation sensor Sr1, Sr2, Sr3, Sr4. The detector DT can be configured to determine the non-operational state of the bicycle 10 when the detector DT has not detected the signal from the at least one rotation sensor Sr1, Sr2, Sr3, Sr4, which means at least one rotation has not been detected by the at least one rotation sensor Sr1, Sr2, Sr3, Sr4. The detector DT is configured to determine the operational state of the bicycle 10 when the detector DT detects the signal from the bicycle lock-state sensor Sk, which indicates the bicycle 10 is unlocked. The detector DT can be configured to determine the non-operational state of the bicycle 10 when the detector DT has not detected the signal from the bicycle lock-state sensor Sk.

As seen in FIG. 3, the first detector DT1 further includes a processor Pr4 and a memory Mo4. The processor Pr4 includes a CPU and a memory controller. The memory Mo4 includes a ROM and a RAM. The ROM includes a non-transitory computer-readable storage medium. The RAM includes a transitory computer-readable storage medium. The memory Mo4 includes storage areas each having an address in the ROM and the RAM. The processor Pr4 is configured to control the memory Mo4 to store data in the storage areas of the memory Mo4 and to read data from the storage areas of the memory Mo4.

At least one program is stored in the memory Mo4 (e.g., the ROM). The at least one program is read into the processor Pr4, and thereby functions of the first detector DT1 are performed. The processor Pr4 and the memory Mo4 are mounted on the circuit board Bo3 and are connected to each other with the bus Bu1. The processor Pr4 can be integrated into the processor Pr3, and the memory Mo4 can be integrated into the memory Mo3.

Further, the wireless receiving device 12 (the suspension 18 (the electric front suspension FS)) comprises a power source PS configured to supply a first electric power to a receiver RV. In the following description, the power source PS of the electric front suspension FS is specifically referred to as a first power source PS1. The first power source PS1 is electrically connected to the first receiver RV1, a first wireless transmitter WT1, the first bicycle component controller CC1, the first detector DT1, the valve position sensor FSS, and the first electric actuator FSA. Accordingly, the first power source PS1 is configured to supply the first electric power to the first receiver RV1 and the first wireless transmitter WT1. Further, the first power source PS1 is configured to supply the first electric power to the first bicycle component controller CC1, the first detector DT1, the valve position sensor FSS, and the first electric actuator FSA. The first power source PS1 can include a primary battery such as a lithium manganese dioxide battery and a secondary battery such as a lithium-ion secondary battery. In this embodiment, the first power source PS1 includes a primary button battery. The first electric actuator FSA, the valve position sensor FSS, the first receiver RV1, the first wireless transmitter WT1, the first bicycle component controller CC1, the first detector DT1, and the first power source PS1 constitute a suspension motor unit FSMU.

The electric rear suspension RS can have substantially the same feature as that of the electric front suspension FS. In such a case, the electric rear suspension RS can be configured to receive the unlock control signal WS12A and the lock control signal WS12B to perform the same control as the electric front suspension FS. Alternatively, the bicycle electric operating device 22 can transmit, to the electric rear suspension RS, different unlock and lock control signals from unlock control signal WS12A and the lock control signal WS12B, and the electric rear suspension RS can be configured to receive the different unlock and control signals to perform the same control as the electric front suspension FS.

Derailleur

As seen in FIG. 5, the bicycle rear derailleur RD includes a base member RD1, a movable member RD2, and a second electric actuator RDA. The second electric actuator RDA can also be referred to as a shifting electric actuator RDA. The movable member RD2 is movably coupled to the base member RD1. The movable member RD2 is movable relative to the base member RD1 to change a gear stage of the bicycle rear derailleur RD. The shifting electric actuator RDA is operatively coupled to the movable member RD2 to move the movable member RD2 relative to the base member RD1. The base member RD1 is attached to the bicycle body B (FIG. 1). The shifting electric actuator RDA is configured to move the movable member RD2 relative to the base member RD1 to shift the bicycle chain C relative to the rear sprocket assembly BC2. The shifting electric actuator RDA is provided in the base member RD1. However, the shifting electric actuator RDA can be provided at the movable member RD2 or other positions.

In this embodiment, the movable member RD2 includes the chain guide RD21, the first pulley RD22, and a second pulley RD23. The chain guide RD21 is movably coupled to the base member RD1. The first pulley RD22 is rotatably coupled to the chain guide RD21. The second pulley RD23 is rotatably coupled to the chain guide RD21. The bicycle chain C is engaged with the first pulley RD22 and the second pulley RD23.

The shifting electric actuator RDA is operatively coupled to the movable member RD2 (the chain guide RD21). In this embodiment, the shifting electric actuator RDA includes a direct-current (DC) motor having a rotational shaft mechanically coupled to the movable member RD2. Other examples of the shifting electric actuator RDA include a stepper motor and an alternating-current (AC) motor.

As seen in FIG. 3, the derailleur t (the bicycle rear derailleur RD) further includes a shift position sensor RDS. The bicycle rear derailleur RD has a plurality of available shift positions. In this embodiment, the bicycle rear derailleur RD has twelve available shift positions respectively corresponding to the first to twelfth rear sprockets R1 to R12 (FIG. 1).

The shift position sensor RDS is configured to sense a position of the shifting electric actuator RDA as the shift position of the bicycle rear derailleur RD. In this embodiment, the shift position sensor RDS is a contact rotational position sensor such as a potentiometer. The shift position sensor RDS is configured to sense an absolute rotational position of the rotational shaft of the shifting electric actuator RDA as the shift position of the bicycle rear derailleur RD. Other examples of the shift position sensor RDS include a non-contact rotational position sensor such as an optical sensor (e.g., a rotary encoder) and a magnetic sensor (e.g., a hall sensor).

The wireless receiving device 12 (the derailleur 14 (the bicycle rear derailleur RD)) comprises a receiver RV configured to receive a radio wave including a communication signal WS11, WS21 to communicate a component of the human powered vehicle 1 (the derailleur 14 (the bicycle rear derailleur RD)). In the following description, the receiver RV of the derailleur 14 (the bicycle rear derailleur RD) is specifically referred to as a second receiver RV2. The wireless receiving device 12 (the derailleur 14 (the bicycle rear derailleur RD)) comprises the controller CC. In the following description, the controller CC of the derailleur 14 is specifically referred to as a second bicycle component controller CC2. The shifting electric actuator RDA, the shift position sensor RDS, the second receiver RV2, and the second wireless transmitter WT2 are electrically connected to the second bicycle component controller CC2.

The second bicycle component controller CC2 is configured to control the shifting electric actuator RDA based on upshift and downshift control signals WS11 and WS21 and the shift position sensed by the shift position sensor RDS. Specifically, the second bicycle component controller CC2 is configured to control a rotational direction and a rotational speed of the rotational shaft based on the shift position and each of upshift and downshift control signals WS11 and WS21. The second bicycle component controller CC2 is configured to control the shifting electric actuator RDA to move the movable member RD2 relative to the base member RD1 in an upshifting direction in response to the upshift control signal WS11. The second bicycle component controller CC2 is configured to control the shifting electric actuator RDA to move the movable member RD2 relative to the base member RD1 in a downshifting direction in response to the downshift control signal WS21.

Furthermore, the second bicycle component controller CC2 is configured to stop rotation of the rotational shaft to position the chain guide RD21 at one of the low to top gear positions based on the shift position and each of the upshift and downshift control signals WS11 and WS21. The shift position sensor RDS transmits a current shift position to the second bicycle component controller CC2. The second bicycle component controller CC2 stores the shift position transmitted from the shift position sensor RDS as a latest rear shift position.

The second bicycle component controller CC2 is constituted as a microcomputer and includes a processor Pr5 and a memory Mo5. The processor Pr5 includes a CPU and a memory controller. The memory Mo5 includes a ROM and a RAM. The ROM includes a non-transitory computer-readable storage medium. The RAM includes a transitory computer-readable storage medium. The memory Mo6 includes storage areas each having an address in the ROM and the RAM. The processor Pr5 controls the memory Mo5 to store data in the storage areas of the memory Mo5 and reads data from the storage areas of the memory Mo6.

At least one program is stored in the memory Mo5 (e.g., the ROM). The at least one program is read into the processor Pr5, and thereby functions of the second bicycle component controller CC2 are performed. In addition, the latest rear shift position is stored in the memory Mo5 (e.g., the RAM) to be read by the at least one program. The processor Pr5 and the memory Mo5 are mounted on a circuit board Bo4 and are connected to each other with a bus Bu2. The second bicycle component controller CC2 can also be referred to as a second bicycle component control circuit or circuitry CC2.

Further, the wireless receiving device 12 (the derailleur 14 (the bicycle rear derailleur RD)) comprises the detector DT to detect the operational state of the bicycle 10. In the following description, the detector DT of the bicycle rear derailleur RD is specifically referred to as a second detector DT2. The second detector DT2 has substantially the same structure as the first detector DT1 except communication methods (wired or wireless communication) between the second detector DT2 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the second detector DT2 further includes the input interface IF which has substantially the same function as the first input interface IF1 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the second detector DT2 is specifically referred to as a second input interface IF2. For example, the vibration sensor Sv2 and the rotation sensor Sr1 are connected to the second input interface IF2 via the electric cables and are configured to output their signals via the electric cable. However, the other vibration sensor Sv1, the other rotation sensors Sr2, Sr3, and Sr4, the pressure sensors Sp1, Sp2, and Sp3, the strain sensors Ss1 and Ss2, and the bicycle lock-state sensor Sk are configured to output their signals via wireless communication between the second receiver RV2 and another wireless communicator OWC1, OWC2 or another wireless transmitter WT1, WT3, WT4, etc.

As seen in FIG. 3, the second detector DT2 further includes a processor Pr6 and a memory Mo6. The processor Pr6 includes a CPU and a memory controller. The memory Mo6 includes a ROM and a RAM. The ROM includes a non-transitory computer-readable storage medium. The RAM includes a transitory computer-readable storage medium. The memory Mo6 includes storage areas each having an address in the ROM and the RAM. The processor Pr6 is configured to control the memory Mo6 to store data in the storage areas of the memory Mo6 and to read data from the storage areas of the memory Mo6.

At least one program is stored in the memory Mo6 (e.g., the ROM). The at least one program is read into the processor Pr6, and thereby functions of the second detector DT2 are performed. The processor Pr6 and the memory Mo6 are mounted on the circuit board Bo4 and are connected to each other with the bus Bu2. The processor Pr6 can be integrated into the processor Pr5, and the memory Mo6 can be integrated into the memory Mo5.

Further, the wireless receiving device 12 (the derailleur 14 (the bicycle rear derailleur RD)) comprises a power source PS configured to supply a first electric power to a receiver RV. In the following description, the power source PS of the derailleur 14 (the bicycle rear derailleur RD) is specifically referred to as a second power source PS2. The second power source PS2 is electrically connected to the second receiver RV2, the second wireless transmitter WT2, the second bicycle component controller CC2, the second detector DT2, the shift position sensor RDS, and the shifting electric actuator RDA. Accordingly, the second power source PS2 is configured to supply the first electric power to the second receiver RV2 and the second wireless transmitter WT2. Further, the second power source PS2 is configured to supply the first electric power to the second bicycle component controller CC2, the second detector DT2, the shift position sensor RDS, and the shifting electric actuator RDA. The second power source PS2 can include a primary battery such as a lithium manganese dioxide battery and a secondary battery such as a lithium-ion secondary battery. In this embodiment, the second power source PS2 includes a primary button battery. The shifting electric actuator RDA, the shift position sensor RDS, the second receiver RV2, the second wireless transmitter WT2, the second bicycle component controller CC2, the second detector DT2, and the second power source PS2 constitute a derailleur motor unit RDMU.

Adjustable Seatpost

Figure 6:
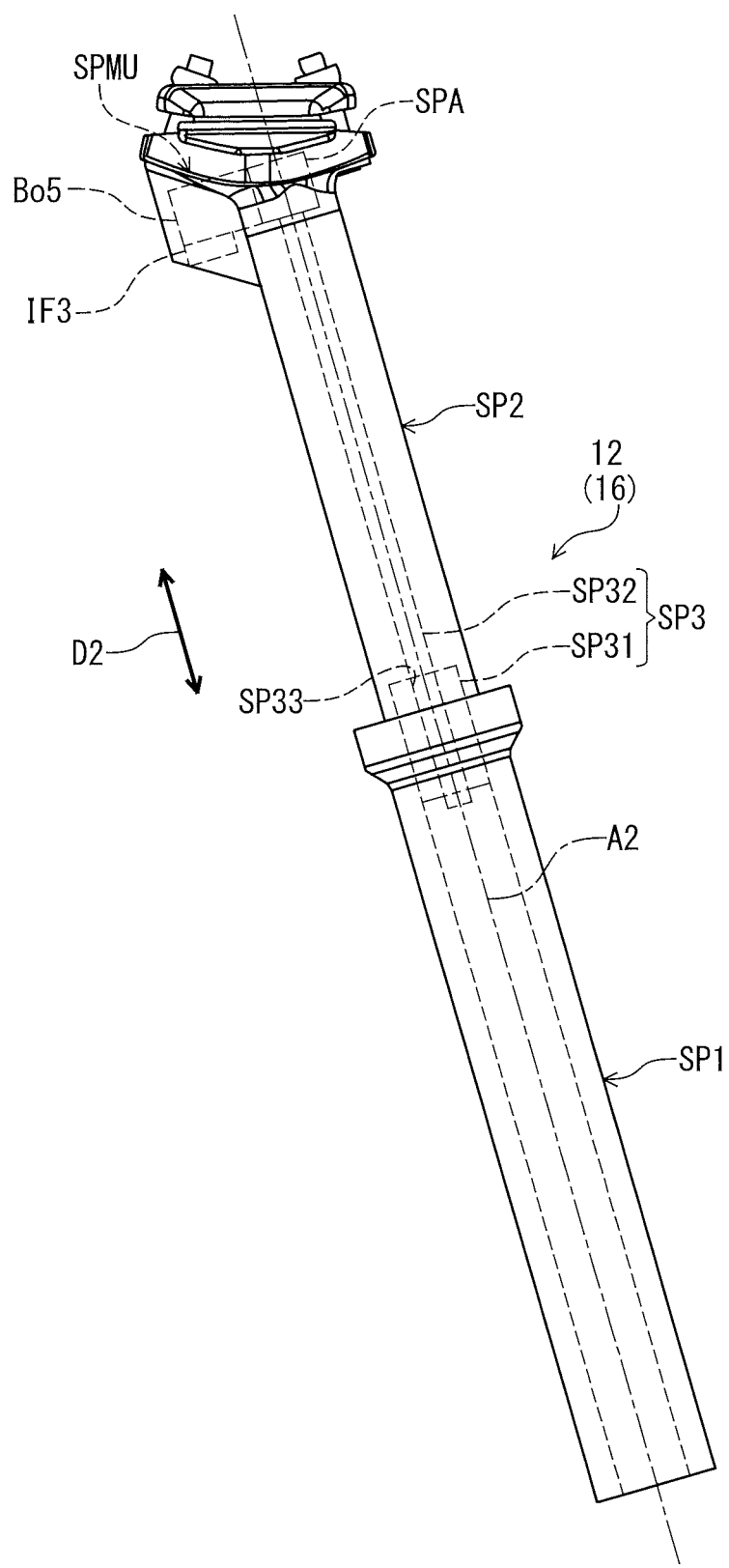
FIG. 6 is a side elevational view of the wireless receiving device (an adjustable seatpost) illustrated in FIG. 1.

As seen in FIG. 6, the adjustable seatpost 16 includes a first tube SP1, a second tube SP2, a positioning structure SP3, and a third electric actuator SPA. The third electric actuator SPA can also be referred to as a seatpost electric actuator SPA. The adjustable seatpost 16 has the positioning state and the adjustable state. In the positioning state, the first tube SP1 and the second tube SP2 are fixedly positioned relative to each other in a telescopic direction D2 to maintain an overall length of the adjustable seatpost 16. In the adjustable state, the first tube SP1 and the second tube SP2 are relatively movable relative to each other in the telescopic direction D2 to change the overall length.

The first tube SP1 has a center axis A2. The first tube SP1 is secured to the bicycle body B (FIG. 1). The second tube SP2 is telescopically received in the first tube SP1. The positioning structure SP3 is configured to relatively position the first tube SP1 and the second tube SP2 in the telescopic direction D2 parallel to the center axis A2 of the first tube SP1. The seatpost electric actuator SPA is configured to actuate the positioning structure SP3. The seatpost electric actuator SPA is coupled to the positioning structure SP3 to actuate the positioning structure SP3. In this embodiment, the seatpost electric actuator SPA is mounted on an upper end of the second tube SP2. However, the seatpost electric actuator SPA can be provided at other positions in the adjustable seatpost 16. For example, the seatpost electric actuator SPA can be provided at a lower end of an interior of the first tube SP1 or an upper end of the first tube SP1.

The positioning structure SP3 includes a guide SP31 and a screw rod SP32. The guide SP31 is secured to the first tube SP1 and extends in the first tube SP1. The guide SP31 includes a threaded hole SP33. The screw rod SP32 is threadedly engaged with the threaded hole SP33. The seatpost electric actuator SPA is coupled to the screw rod SP32 to rotate the screw rod SP32 relative to the second tube SP2. Rotation of the screw rod SP32 moves the second tube SP2 relative to the first tube SP1 in the telescopic direction D2.

As seen in FIG. 3, the adjustable seatpost 16 includes a seatpost position sensor SPS. The seatpost position sensor SPS is configured to sense a rotational position of the screw rod SP32. In this embodiment, the seatpost position sensor SPS is a contact rotational position sensor such as a potentiometer. The seatpost position sensor SPS is configured to sense an absolute rotational position of the rotational shaft of the seatpost electric actuator SPA. Other examples of the seatpost position sensor SPS include a non-contact rotational position sensor such as an optical sensor (e.g., a rotary encoder) and a magnetic sensor (e.g., a hall sensor).

The wireless receiving device 12 (the adjustable seatpost 16) comprises a receiver RV configured to receive a radio wave including a communication signal WS22A, WS22B to communicate a component of the human powered vehicle 1 (the adjustable seatpost 16). In the following description, the receiver RV of the adjustable seatpost 16 is specifically referred to as a third receiver RV3. The wireless receiving device 12 (the adjustable seatpost 16) comprises the controller CC. In the following description, the controller CC of the adjustable seatpost 16 is specifically referred to as a third bicycle component controller CC3. The seatpost position sensor SPS, the seatpost electric actuator SPA, the third receiver RV3, and the third wireless transmitter WT3 are electrically connected to the third bicycle component controller CC3.

The third bicycle component controller CC3 is configured to control the seatpost electric actuator SPA based on the first or second seatpost control signal WS22A or WS22B and the position sensed by the seatpost position sensor SPS. Specifically, the third bicycle component controller CC3 is configured to control a rotational direction of the rotational shaft based on the rotational position and the first or second seatpost control signal WS22A or WS22B. The third bicycle component controller CC3 is configured to control the seatpost electric actuator SPA to stop rotating the rotational shaft when the overall length of the adjustable seatpost 16 reaches the maximum length or the minimum length regardless of the first and second seatpost control signals WS22A and WS22B.

The third bicycle component controller CC3 is configured to control the seatpost electric actuator SPA based on the first and second seatpost control signals WS22A and WS22B to move the second tube SP2 relative to the first tube SP1 in the telescopic direction D2. The third bicycle component controller CC3 is configured to control the seatpost electric actuator SPA to move the second tube SP2 for shortening the adjustable seatpost 16 in response to the first seatpost control signal WS22A. The seatpost actuator driver SP7 controls the seatpost electric actuator SPA to move the second tube SP2 for lengthening the adjustable seatpost 16 in response to the second seatpost control signal WS22B.

The third bicycle component controller CC3 is constituted as a microcomputer and includes a processor Pr7 and a memory Mo7. The processor Pr7 includes a CPU and a memory controller. The memory Mo7 includes a ROM and a RAM. The ROM includes a non-transitory computer-readable storage medium. The RAM includes a transitory computer-readable storage medium. The memory Mo7 includes storage areas each having an address in the ROM and the RAM. The processor Pr7 controls the memory Mo7 to store data in the storage areas of the memory Mo7 and reads data from the storage areas of the memory Mo7.

At least one program is stored in the memory Mo7 (e.g., the ROM). The at least one program is read into the processor Pr7, and thereby functions of the third bicycle component controller CC3 are performed. In addition, the maximum length and the minimum length are stored in the memory Mo7 (e.g., the RAM) to be read by the at least one program. The processor Pr7 and the memory Mo7 are mounted on a circuit board Bo5 and are connected to each other with a bus Bu3. The third bicycle component controller CC3 can also be referred to as a third bicycle component control circuit or circuitry CC3.

Further, the wireless receiving device 12 (the adjustable seatpost 16) comprises the detector DT to detect the operational state of the bicycle 10. In the following description, the detector DT of the adjustable seatpost 16 is specifically referred to as a third detector DT3. The third detector DT3 has substantially the same structure as the first detector DT1 and the second detector DT2 except communication methods (wired or wireless communication) between the third detector DT3 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the third detector DT3 further includes the input interface IF which has substantially the same function as the first input interface IF1 and the second input interface IF2 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the third detector DT3 is specifically referred to as a third input interface IF3. For example, the pressure sensor Sp3 is connected to the third input interface IF3 via the electric cables and configured to output signals via the electric cable. However, the vibration sensors Sv1, Sv2, the rotation sensors Sr1, Sr2, Sr3, and Sr4, the other pressure sensors Sp1 and Sp2, the strain sensors Ss1 and Ss2, and the bicycle lock-state sensor Sk are configured to output their signals via wireless communication between the third receiver RV3 and another wireless communicator OWC1, OWC2 or another wireless transmitter WT1, WT2, WT4, etc.

As seen in FIG. 3, the third detector DT3 further includes a processor Pr8 and a memory Mo8. The processor Pr8 includes a CPU and a memory controller. The memory Mo8 includes a ROM and a RAM. The ROM includes a non-transitory computer-readable storage medium. The RAM includes a transitory computer-readable storage medium. The memory Mo8 includes storage areas each having an address in the ROM and the RAM. The processor Pr8 is configured to control the memory Mo8 to store data in the storage areas of the memory Mo8 and to read data from the storage areas of the memory Mo8.

At least one program is stored in the memory Mo8 (e.g., the ROM). The at least one program is read into the processor Pr8, and thereby functions of the third detector DT3 are performed. The processor Pr8 and the memory Mo8 are mounted on the circuit board Bo5 and are connected to each other with the bus Bu3. The processor Pr8 can be integrated into the processor Pr7, and the memory Mo8 can be integrated into the memory Mo1.

Further, the wireless receiving device (the adjustable seatpost 16) comprises a power source PS configured to supply a first electric power to a receiver RV. In the following description, the power source PS of the adjustable seatpost 16 is specifically referred to as a third power source PS3. The third power source PS3 is electrically connected to the third receiver RV3, the third wireless transmitter WT3, the third bicycle component controller CC3, the third detector DT3, the seatpost position sensor SPS, and the seatpost electric actuator SPA. Accordingly, the third power source PS3 is configured to supply the first electric power to the third receiver RV3 and the third wireless transmitter WT3. Further, the third power source PS3 is configured to supply the first electric power to the third bicycle component controller CC3, the third detector DT3, the seatpost position sensor SPS, and the seatpost electric actuator SPA. The third power source PS3 can include a primary battery such as a lithium manganese dioxide battery and a secondary battery such as a lithium-ion secondary battery. In this embodiment, the third power source PS3 includes a primary button battery. The seatpost electric actuator SPA, the seatpost position sensor SPS, the third receiver RV3, the third wireless transmitter WT3, the third bicycle component controller CC3, the third detector DT3, and the third power source PS3 constitute a seatpost motor unit SPMU.

Auxiliary Drive Unit

As seen in FIG. 3, the auxiliary drive unit 20 includes an assist motor AM and a torque sensor TS. The assist motor AM is configured to generate the auxiliary drive force. The assist motor AM is coupled to the crank assembly BC1 to transmit the auxiliary drive force. The torque sensor TS is configured to sense an input torque applied to the crank assembly BC1 from the rider during pedaling. The torque sensor TS is attached to the crank assembly BC1. The torque sensor TS can include the strain gauge Ss1.

Further, the wireless receiving device 12 (the auxiliary drive unit 20) comprises a receiver RV configured to receive a radio wave including a communication signal WS13A, WS13B, WS13C to communicate a component of the human powered vehicle 1 (the auxiliary drive unit 20). In the following description, the receiver RV of the auxiliary drive unit 20 is specifically referred to as a fourth receiver RV4. The wireless receiving device 12 (the auxiliary drive unit 20) comprises the controller CC. In the following description, the controller CC of the auxiliary drive unit 20 is specifically referred to as a fourth bicycle component controller CC4. The torque sensor TS, the assist motor AM, the fourth receiver RV4, and the fourth wireless transmitter WC4 are electrically connected to the fourth bicycle component controller CC4.

The auxiliary drive unit 20 has a first assist mode, a second assist mode, and a third assist mode. The first assist mode has a first assist ratio. The second assist mode has a second assist ratio. The third assist mode has a third assist ratio. In this embodiment, the first assist ratio is the highest among the first to third assist ratios. The third assist ratio is the lowest among the first to third assist ratios.

In the first assist mode, the fourth bicycle component controller CC4 is configured to control the assist motor AM to generate the auxiliary drive force in accordance with the first assist ratio and the input torque sensed by the torque sensor TS. More specifically, in the first assist mode, the fourth bicycle component controller CC4 is configured to control the assist motor AM to generate the auxiliary drive force having a torque obtained by multiplying the input torque by the first assist ratio. In the second assist mode, the fourth bicycle component controller CC4 is configured to control the assist motor AM to generate the auxiliary drive force having a torque obtained by multiplying the input torque by the second assist ratio. In the third assist mode, the fourth bicycle component controller CC4 is configured to control the assist motor AM to generate the auxiliary drive force having a torque obtained by multiplying the input torque by the third assist ratio.

The auxiliary drive unit 20 is configured to change an assist mode among the first to third assist modes in response to the first-mode to third-mode control signals WS13A to WS13C. The auxiliary drive unit 20 is configured to change the assist mode to the first assist mode in response to the first-mode control signal WS13A. The auxiliary drive unit 20 is configured to change the assist mode to the second assist mode in response to the second-mode control signal WS13B. The auxiliary drive unit 20 is configured to change the assist mode to the third assist mode in response to the third-mode control signal WS13C.

As seen in FIG. 3, the fourth bicycle component controller CC4 is constituted as a microcomputer and includes a processor Pr9 and a memory Mo9. The processor Pr9 includes a CPU and a memory controller. The memory Mo9 includes a ROM and a RAM. The ROM includes a non-transitory computer-readable storage medium. The RAM includes a transitory computer-readable storage medium. The memory Mo9 includes storage areas each having an address in the ROM and the RAM. The processor Pr9 is configured to control the memory Mo9 to store data in the storage areas of the memory Mo9 and to read data from the storage areas of the memory Mo9.

At least one program is stored in the memory Mo9 (e.g., the ROM). In addition, the memory Mo9 (e.g. the ROM) stores the first to third assist ratios. The at least one program is read into the processor Pr9, and thereby functions of the fourth bicycle component controller CC4 are performed. The processor Pr9 and the memory Mo9 are mounted on a circuit board Bo6 and are connected to each other with the bus Bu4. The fourth bicycle component controller CC4 can also be referred to as a fourth bicycle component control circuit or circuitry CC4.

Further, the wireless receiving device 12 (the auxiliary drive unit 20) comprises the detector DT to detect the operational state of the bicycle 10. In the following description, the detector DT of the auxiliary drive unit 20 is specifically referred to as a fourth detector DT4. The fourth detector DT4 has substantially the same structure as the first to third detectors DT1 to DT3 except communication methods (wired or wireless communication) between the fourth detector DT4 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the fourth detector DT4 further includes the input interface IF which has substantially the same function as the first to third input interfaces IF1 to IF3 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the fourth detector DT4 is specifically referred to as a fourth input interface IF4. For example, the rotation sensors Sr2, Sr1, and Sr4 and the bicycle lock-state sensor Sk are connected to the fourth input interface IF4 via the electric cables and are configured to output their signals via the electric cable. However, the vibration sensor Sv1, Sv2, and the other rotation sensor Sr1, the pressure sensors Sp1, Sp2, and Sp3, and the strain sensors Ss1 and Ss2 are configured to output their signals via wireless communication between the fourth receiver RV4 and another wireless communicator OWC1, OWC2 or another wireless transmitter WT1, WT2, WT3, etc.

As seen in FIG. 3, the fourth detector DT4 further includes a processor Pr10 and a memory Mo10. The processor Pr10 includes a CPU and a memory controller. The memory Mo10 includes a ROM and a RAM. The ROM includes a non-transitory computer-readable storage medium. The RAM includes a transitory computer-readable storage medium. The memory Mo10 includes storage areas each having an address in the ROM and the RAM. The processor Pr10 is configured to control the memory Mo10 to store data in the storage areas of the memory Mo10 and to read data from the storage areas of the memory Mo10.

At least one program is stored in the memory Mo10 (e.g., the ROM). The at least one program is read into the processor Pr10, and thereby functions of the fourth detector DT4 are performed. The processor Pr10 and the memory Mo10 are mounted on the circuit board Bo6 and are connected to each other with the bus Bu4. The processor Pr10 can be integrated into the processor Pr9, and the memory Mo10 can be integrated into the memory Mo9.

Further, the wireless receiving device (the auxiliary drive unit 20) comprises a power source PS configured to supply a first electric power to a receiver RV. In the following description, the power source PS of the auxiliary drive unit 20 is specifically referred to as a fourth power source PS4. The fourth power source PS4 is electrically connected to the fourth receiver RV4, the fourth wireless transmitter WT4, the fourth bicycle component controller CC4, the fourth detector DT4, the torque sensor TS, and the assist motor AM. Accordingly, the fourth power source PS4 is configured to supply the first electric power to the fourth receiver RV4 and the fourth wireless transmitter WT4. Further, the fourth power source PS4 is configured to supply the first electric power to the fourth bicycle component controller CC4, the fourth detector DT4, the torque sensor TS, and the assist motor AM. The fourth power source PS4 can include a large capacity lithium-ion battery. As seen in FIG. 1, the fourth power source PS4 is mounted to the bicycle body B. As seen in FIG. 2, the fourth power source PS4 is detachably attached to the battery holder BH. The fourth receiver RV4, the fourth wireless transmitter WT4, and the fourth bicycle component controller CC4 can be provided in the battery holder BH.

Wireless Receiving Device Features

In this embodiment, the receiver RV is configured to execute at least one of operation modes including a first mode and a second mode in which the receiver RV consumes less electric power than in the first mode. That is, the receiver RV is configured to operate in at least one of the operation modes including the first mode and the second mode.

Figure 7:
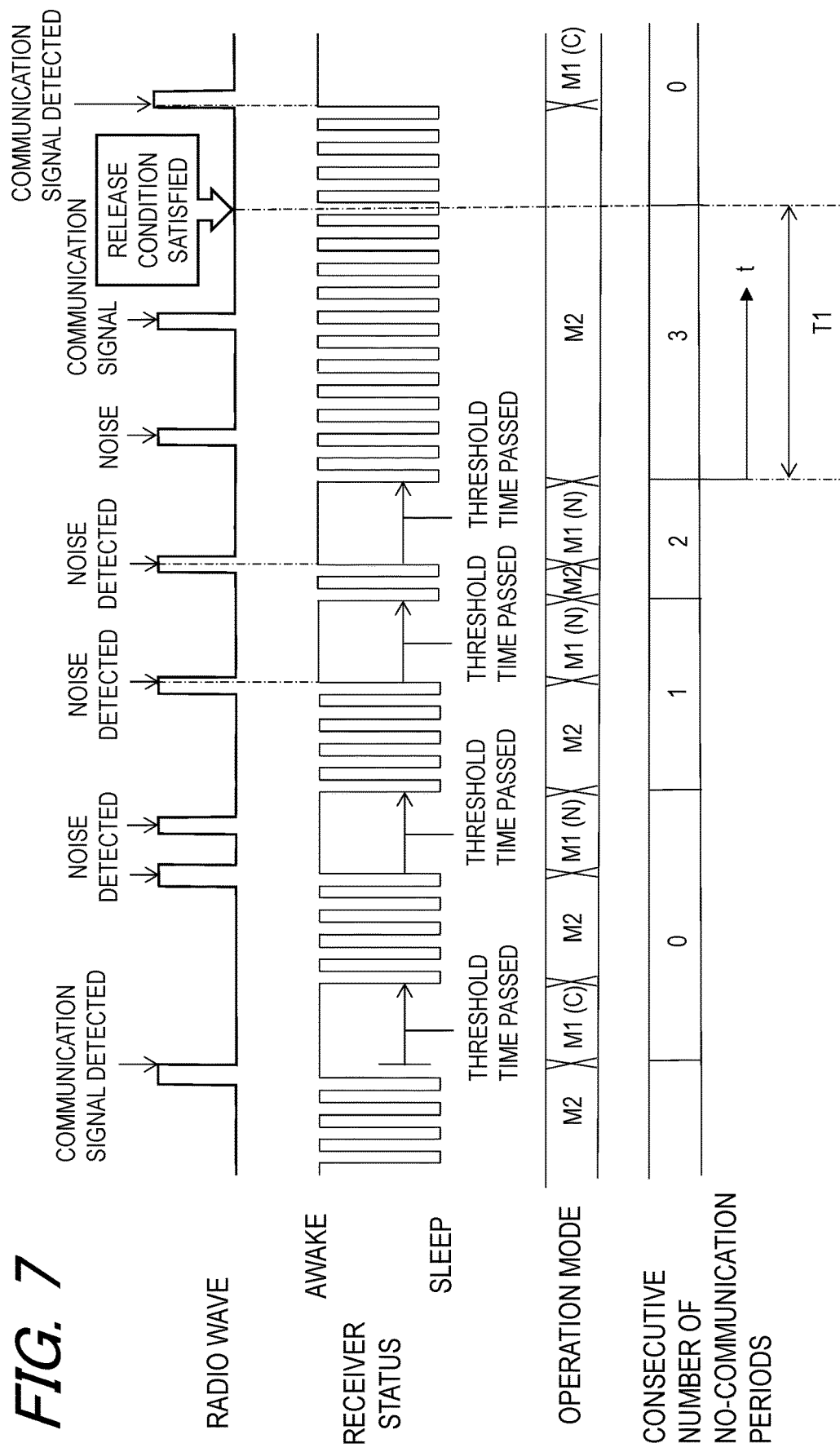
FIG. 7 is a timing chart of a first mode and a second mode of the wireless receiving device illustrated in FIGS. 1 and 3 in accordance with the first embodiment.

As seen in FIG. 7, the receiver RV is configured to receive the radio wave in an awake period. That is, the receiver RV is activated in the awake period. The receiver RV is configured not to receive the radio wave in a sleep period. That is, the receiver RV is not activated in the sleep period. In the awake period, the controller CC is configured to determine whether the received radio wave is a communication signal or a noise signal by checking for example, a Service Set Identifier (SSID), a header message, or a signature of the radio wave. In FIG. 7, the first mode and the second mode are shown as "M1" and "M2", respectively. As shown in FIG. 7, an entire period during which the receiver RV is in the first mode M1 is the awake period. The awake period and the sleep period occur while the receiver is in the second mode M2. Specifically, in the second mode, the awake period and the sleep period alternately periodically occur. Especially in this embodiment, the controller CC is configured to count a consecutive number of a plurality of no-communication periods if no-communication periods consecutively occur. Each of the no-communication periods is a period in which the receiver RV does not receive the communication signal during an entirety of a first-mode period. The first-mode period is a period during which the receiver RV operates in the first mode M1. In FIG. 7, the no-communication periods are shown as "M1 (N)" in the "OPERATION MODE" row. Contrary to the no-communication periods, a communication period is a period in which the receiver receives the communication signal during the first-mode period. In FIG. 7, the communication periods are shown as "M1 (C)" in the "OPERATION MODE" row. Under the "OPERATION MODE" row, the consecutive number is shown. The consecutive number is stored in the memory Mo3, Mo5, Mo1, Mo9 in the controller CC.

As for changing operation modes, the controller CC is configured to set the receiver RV with the first mode M1 if the consecutive number of the no-communication periods is less than a count threshold CTH. More specifically, the controller CC is configured to set the receiver RV with the first mode M1 if the receiver RV receives the radio wave while the receiver operates in the second mode M2 in a condition that the consecutive number of the no-communication periods is less than a count threshold CTH. In this description, to "set the receiver RV with the first mode M1" means to control the receiver RV to operate in the first mode M1. In an example shown in FIG. 7, the count threshold CTH is three, but the count threshold CTH can be a different number such as two, four, or more. Since the controller CC is configured to count a consecutive number of a plurality of no-communication periods if no-communication periods consecutively occur without a communication period intermitting between the no-communication periods, the consecutive number is set to zero when the communication period occurs while the consecutive number is less than the count threshold CTH.

Further, the controller CC is configured to control the receiver RV to continue operating in the second mode M2 until a release condition is satisfied if the consecutive number of the no-communication periods is more than or equal to the count threshold. More specifically, the controller CC is configured to control the receiver RV to continue operating in the second mode M2 until a release condition is satisfied if the receiver RV receives the radio wave while the receiver RV operates in the second mode M2 in a condition that the consecutive number of the no-communication periods is more than or equal to the count threshold CTH. In FIG. 7, among second-mode periods during each of which the receiver RV operates in the second mode M2, such situation occurs in a fifth second mode period. In the fifth second mode period, both a noise signal and a communication signal comes to the receiver RV, but the receiver RV continues operating in the second mode M2 before the release condition is satisfied. In such a period as the fifth second mode period, the receiver RV may not receive the radio wave. Even though the receiver RV may receive the radio wave in the period, the controller CC may not process the received radio wave.

As for the release condition, the release condition is, for example, as follows: (1) The release condition is a condition in which a first lapse time T1 passes after the consecutive number of the no-communication signal periods becomes more than or equal to the count threshold CTH. As seen in FIG. 7, an elapsed time t after the consecutive number of the no-communication signal periods becomes more than or equal to the count threshold CTH and the first lapse time T1 are illustrated. The release condition is satisfied after the elapsed time t becomes larger than the first lapse time T1.

(2) The release condition is a condition in which a sensor (at least one of the sensors Sr1-Sr4, Sv1-Sv2, Sp1-Sp3, Ss1-Ss2, and Sk) detects information regarding an operational state of the human powered vehicle 1 after the consecutive number of the no-communication signal periods becomes more than or equal to the count threshold CTH. More specifically, the release condition is a condition in which the detector DT detects the operational state of the human powered vehicle 1 based on the output of at least one of the sensors Sr1-Sr4, Sv1-Sv2, Sp1-Sp3, Ss1-Ss2, and Sk after the consecutive number of the no-communication signal periods becomes more than or equal to the count threshold CTH.

(3) The release condition is a condition in which a release mechanism RM is manipulated after the consecutive number of the no-communication signal periods becomes more than or equal to the count threshold CTH. As seen in FIG. 2, the release mechanism RM includes at least one of a button RM1 attached to the suspension 18, a button RM2 attached to the derailleur 14, a lever RM3 attached to the adjustable seatpost 16, and a button RM4 attached to the auxiliary drive unit 20. The lever RM3 and each of the buttons RM1, RM2, RM4 can be a different input interface such as a switch. Further, as seen in FIG. 2, the release mechanism RM (RM1 to RM4) includes an indicator RMi (RM1i to RM4i). The indicator RMi includes at least one of a light emitter, a speaker, and a vibrator. The controller CC is configured to control the indicator RMi to indicate an operational state of the human powered vehicle 1 if the sensor (at least one of Sr1-Sr4, Sv1-Sv2, Sp1-Sp3, Ss1-Ss2, and Sk) detects information regarding the operational state of the human powered vehicle 1. For example, the controller CC can be configured to control the indicator RMi to emit light, generate sound, or vibrate if the sensor (at least one of Sr1-Sr4, Sv1-Sv2, Sp1-Sp3, Ss1-Ss2, and Sk) detects information regarding the operational state of the human powered vehicle 1. Further, as seen in the FIG. 3, each of the release mechanisms RM can be electrically connected to a wireless transmitter (one of WT1 to WT4) to send to another wireless receiving device 12, an information regarding whether the release mechanism RM is manipulated. In this case, at least one of the release mechanisms RM1 to RM4 can be omitted, and each of the wireless receiving devices 12 can use the information received via wireless communication. Further, if the wireless receiving device 12 determines the release condition based on at least one of the conditions (1) and (2), the release mechanism RM can be omitted.

As seen in FIG. 7, when the release condition is satisfied, the consecutive number returns to zero. Accordingly, the controller CC is configured to set the receiver RV with the first mode M1 if the receiver RV receives the radio wave while the receiver RV operates in the second mode M2, after the release condition is satisfied. Further, the controller CC is configured to set the receiver RV with the second mode M2 if the receiver RV does not receive the communication signal in the first-mode period during which the receiver RV operates in the first mode M1. It is determined that the receiver RV does not receive the communication signal in the first-mode period if the receiver RV does not receive the communication signal for a threshold time in the first-mode period. There are two cases in which the receiver RV does not receive the communication signal for the threshold time in the first-mode period. A first case is that the receiver RV has received no radio wave or has received only noise for the threshold time in the first-mode period since the receiver RV received the last communication signal, as shown in the first first-mode period in the FIG. 7. In this case, the consecutive number is not incremented after such first-mode period ends, because such first-mode period is the communication period. A second case is that the first-mode period starts due to reception of a noise signal in the second-mode period, then the receiver RV has received no radio wave or has received only noise for the threshold time after the first-mode period starts, as shown in the second to fourth first-mode periods in the FIG. 7. In this case, the consecutive number is incremented after such first-mode period ends, because such first-mode period is the no-communication period.

The wireless receiving device 12 has the following features.

Since the controller CC is configured to control the receiver RV to continue operating in the second mode M2 until the release condition is satisfied if the consecutive number of the no-communication periods is more than or equal to the count threshold CTH, it is possible to reduce power consumption when the human powered vehicle 1 is exposed to radio waves other than the communication signals.

Modification of First Embodiment

In the first embodiment, it is determined that the receiver RV does not receive the communication signal in the first-mode period if the receiver RV does not receive the communication signal for a threshold time in the first-mode period. However, it can be determined that the receiver RV does not to receive the communication signal in the first-mode period if the receiver RV receives the radio wave other than the communication signal in the first-mode period. Even in such structure, it is possible to reduce power consumption when the human powered vehicle 1 is exposed to radio waves other than the communication signals.

Figure 8:
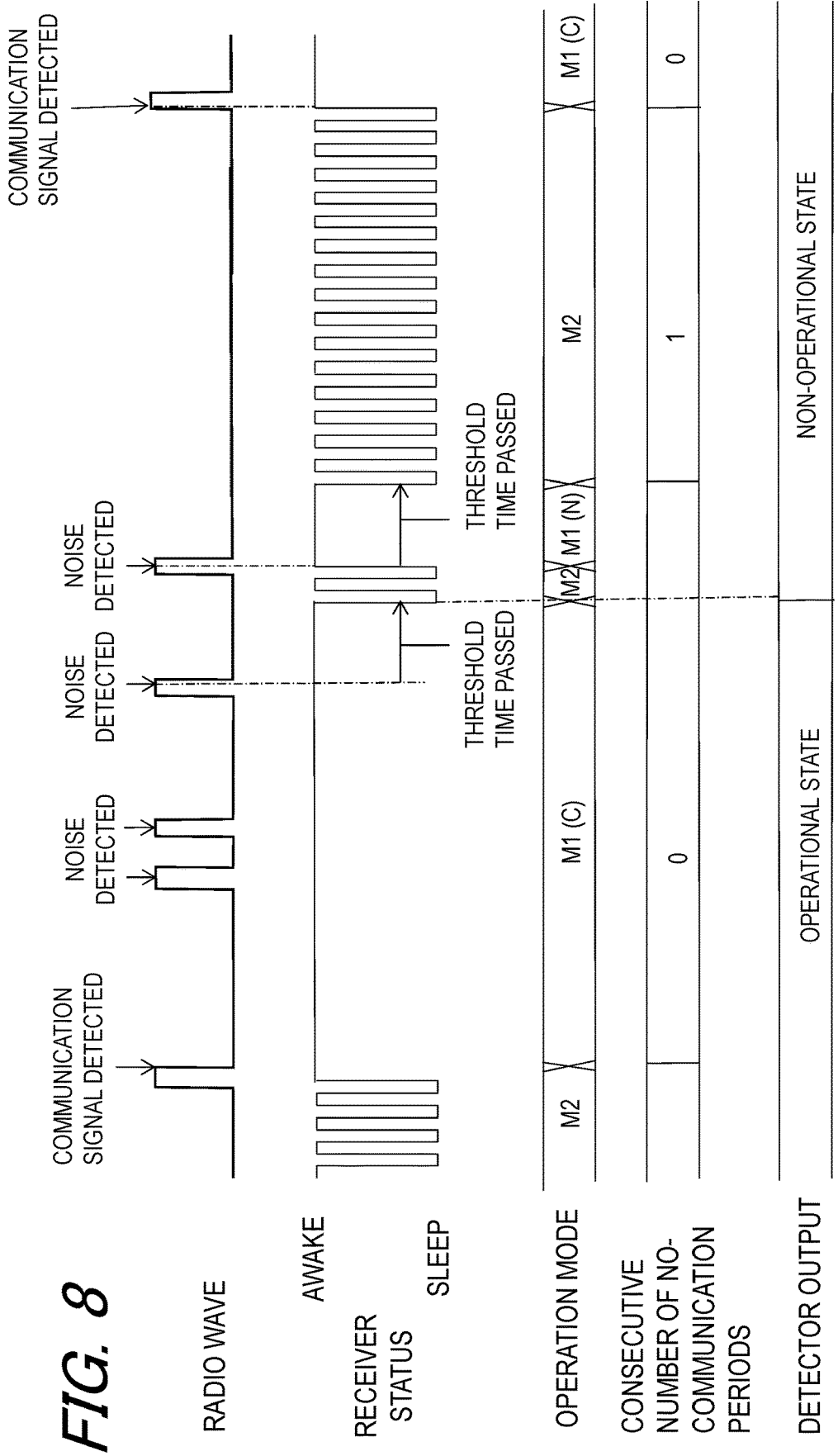
FIG. 8 is a timing chart of the first mode and the second mode of the wireless receiving device illustrated in FIGS. 1 and 3 in accordance with a modification of the first embodiment.

In another modification shown in FIG. 8, the controller CC is configured to set the receiver RV with the second mode M2 if the receiver RV does not receive the communication signal and the sensor (at least one of Sr1-Sr4, Sv1-Sv2, Sp1-Sp3, Ss1-Ss2, and Sk) does not detect information regarding an operational state of the human powered vehicle 1 in the first-mode period. That is, the controller CC is configured to control the receiver RV to operate in the second mode M2 if the receiver RV does not receive the communication signal (e.g. does not receive the communication signal for the threshold time or receives the radio wave other than the communication signal) and the sensor (at least one of Sr1-Sr4, Sv1-Sv2, Sp1-Sp3, Ss1-Ss2, and Sk) does not detect information regarding an operational state of the human powered vehicle 1 in the first-mode period. In addition, the controller CC is configured to control the receiver RV to continue operating in the first mode M1 while the sensor detects information in the first-mode period. As seen in FIG. 8, the controller CC continues the first-mode period until the detector DT detects a non-operational state of the human powered vehicle 1. Accordingly, the first-mode period becomes longer compared to FIG. 7. Therefore, the receiver RV can detect the communication signal as fast as possible when the human powered vehicle 1 is in the operational state.

Figure 9:
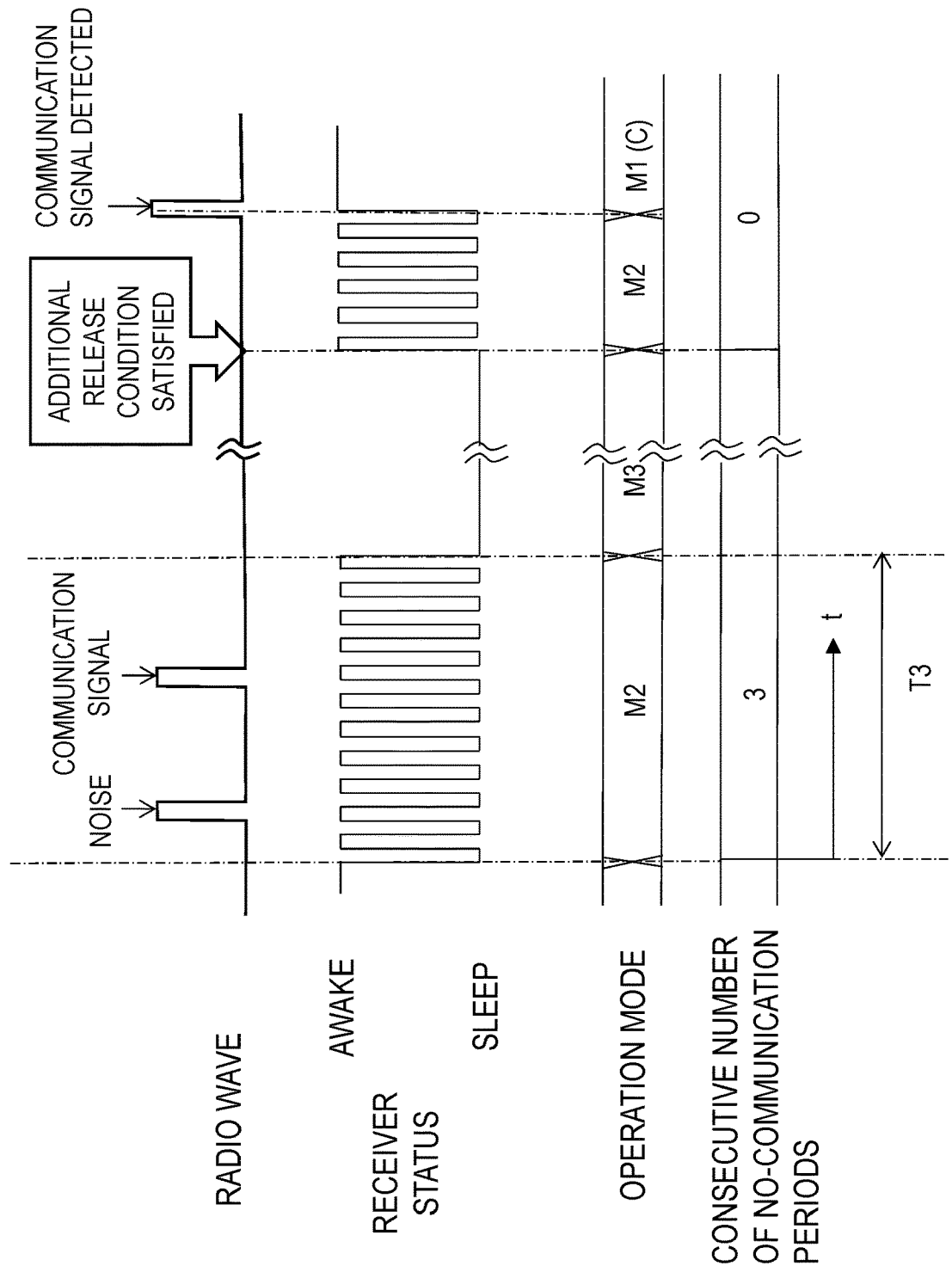
FIG. 9 is a timing chart of the second and the third mode of the wireless receiving device illustrated in FIGS. 1 and 3 in accordance with another modification of the first embodiment.
Figure 10:
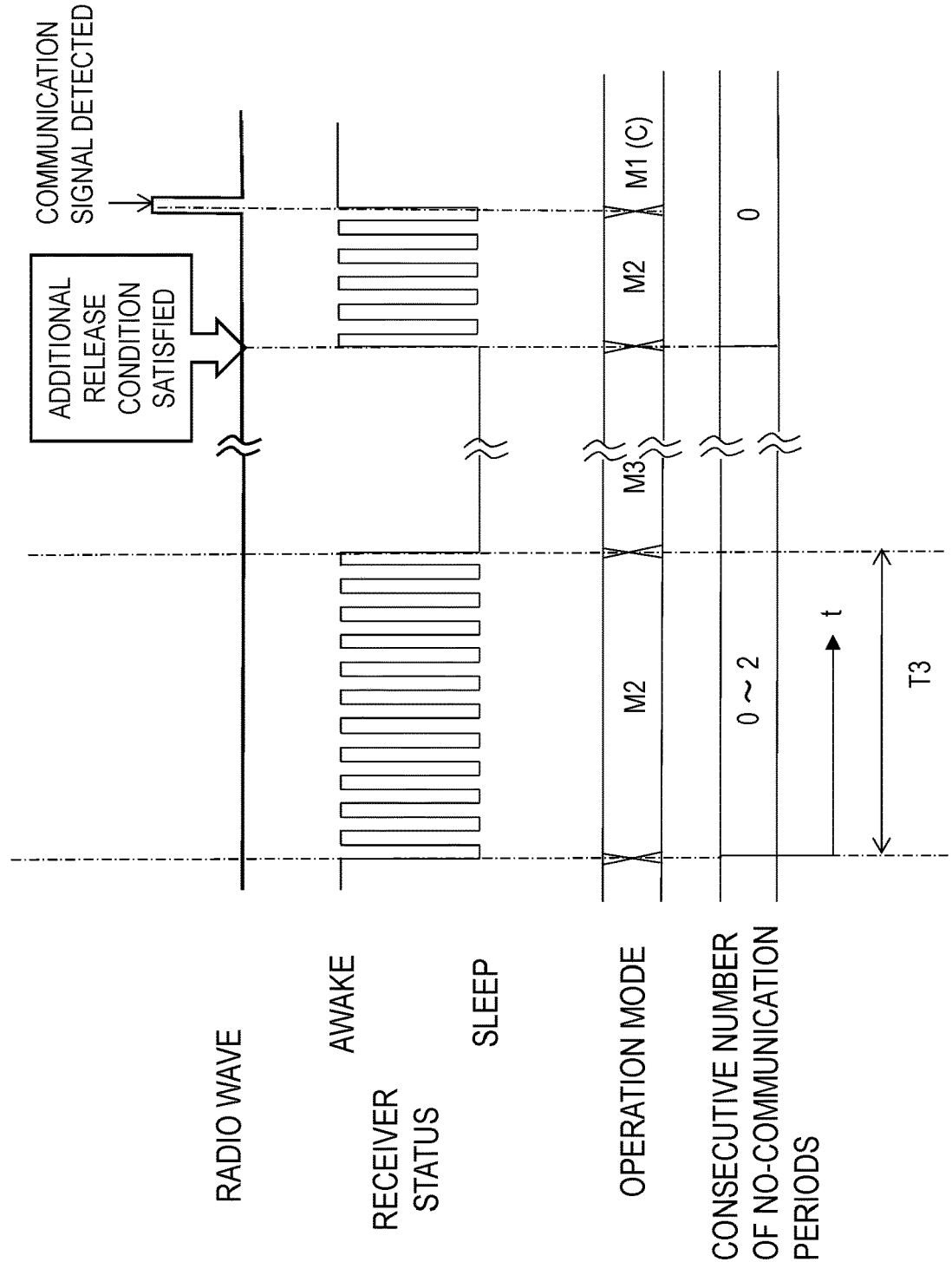
FIG. 10 is another timing chart of the second and the third mode of the wireless receiving device illustrated in FIGS. 1 and 3 in accordance with another modification of the first embodiment.

Further, in another modification as shown in FIGS. 9 and 10, the operation modes can further include a third mode M3 in which the receiver RV consumes less electric power than in the second mode M2. As shown in FIGS. 9 and 10, an entire period during which the receiver is in the third mode M3 is the sleep period. Hereinafter, a period during which the receiver operates in the third mode M3 is a third-mode period. Even when the radio wave including the communication signal arrives at the receiver RV in the third-mode period, the receiver RV doesn't receive the radio wave.

The controller CC is configured to set the receiver RV with the third mode M3 if a third lapse time T3 passes since the controller CC starts controlling the receiver RV to operate in the second mode M2. That is, the controller CC is configured to control the receiver RV to operate in the third mode M3 if the third lapse time T3 passes since the controller CC starts controlling the receiver RV to operate in the second mode M2. More specifically, as seen in an example of FIG. 9, when the third lapse time T3 passes without the release condition satisfied since the controller CC starts controlling the receiver RV to operate in the second mode M2, the controller CC controls the receiver CC to operate in the third mode M3. As seen in FIG. 9, an elapsed time t after the controller CC starts controlling the receiver RV to operate in the second mode M2 and the third lapse time T3 are illustrated. The receiver RV starts operating in the third mode M3 after the elapsed time t becomes larger than the third lapse time T3. Alternatively, as seen in an example of FIG. 10, when the third lapse time T3 passes without the receiver RV receiving any radio wave since the controller CC starts controlling the receiver RV to operate in the second mode M2, the controller CC controls the receiver CC to operate in the third mode M3. As seen in FIG. 10, an elapsed time t after the controller CC starts controlling the receiver RV to operate in the second mode M2 and the third lapse time T3 are illustrated. The receiver RV starts operating in the third mode M3 after the elapsed time t becomes larger than the third lapse time T3. The third lapse time T3 is longer than the first lapse time T1. The third lapse time T3 is preferably more than one day. More preferably, the third lapse time T3 is more than one week (e.g. two weeks), because the third mode M3 is used when a user doesn't use the human powered vehicle 1 for a long time.

As seen in FIGS. 9 and 10, the controller CC is configured to control the receiver RV to continue operating in the third mode M3 until an additional release condition is satisfied while the receiver RV operates in the third mode M3. The additional release condition is, for example, as follows:
(1) The additional release condition is a condition in which the release mechanism RM is manipulated when the receiver RV operates in the third mode M3. The release mechanism RM can be the mechanism with which the release condition is satisfied. The release mechanism RM can have the indicator as shown above.
(2) The additional release condition is a condition in which the sensor (at least one of Sr1-Sr4, Sv1-Sv2, Sp1-Sp3, Ss1-Ss2, and Sk) detects information regarding an operational state of the human powered vehicle 1 when the receiver RV operates in the third mode M3. In this modification, at least one of the bicycle lock-state sensor Sk and the pressure sensors Sp1 and Sp3 are preferably used to detect the operational state of the human powered vehicle 1, because outputs of these sensors indicate high possibility of operation of the human powered vehicle 1.

Second Embodiment

A wireless receiving device 112 provided in accordance with a second embodiment will be described below referring to FIG. 11. The wireless receiving device 112 has the same structure and/or configuration as those of the wireless receiving device 12 except the controller CC' and the receiver RV'. In the second embodiment, the controller CC' and the receiver RV' of the wireless receiving device 112 operate in a different manner from a manner in which the controller CC and the receiver RV operate in the first embodiment. Thus, elements having substantially the same function as those in the first embodiment will be numbered the same here and will not be described and/or illustrated again in detail here for the sake of brevity.

Figure 11:
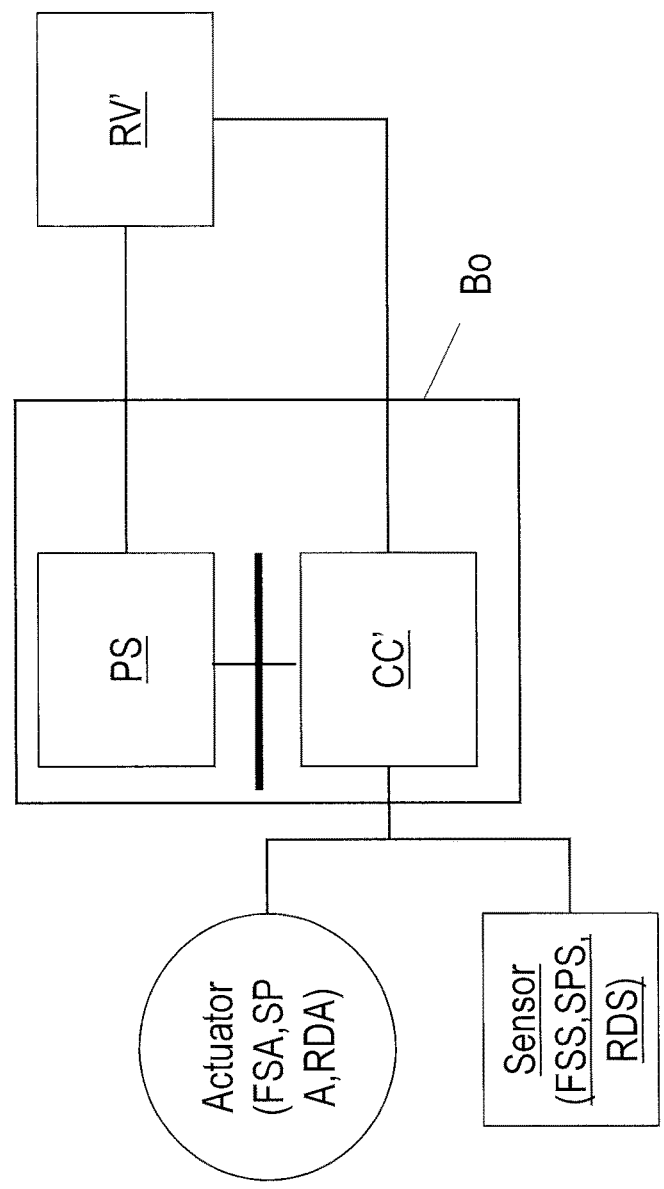
FIG. 11 is a schematic block diagram of a wireless receiving device in accordance with a second embodiment.
Figure 12:
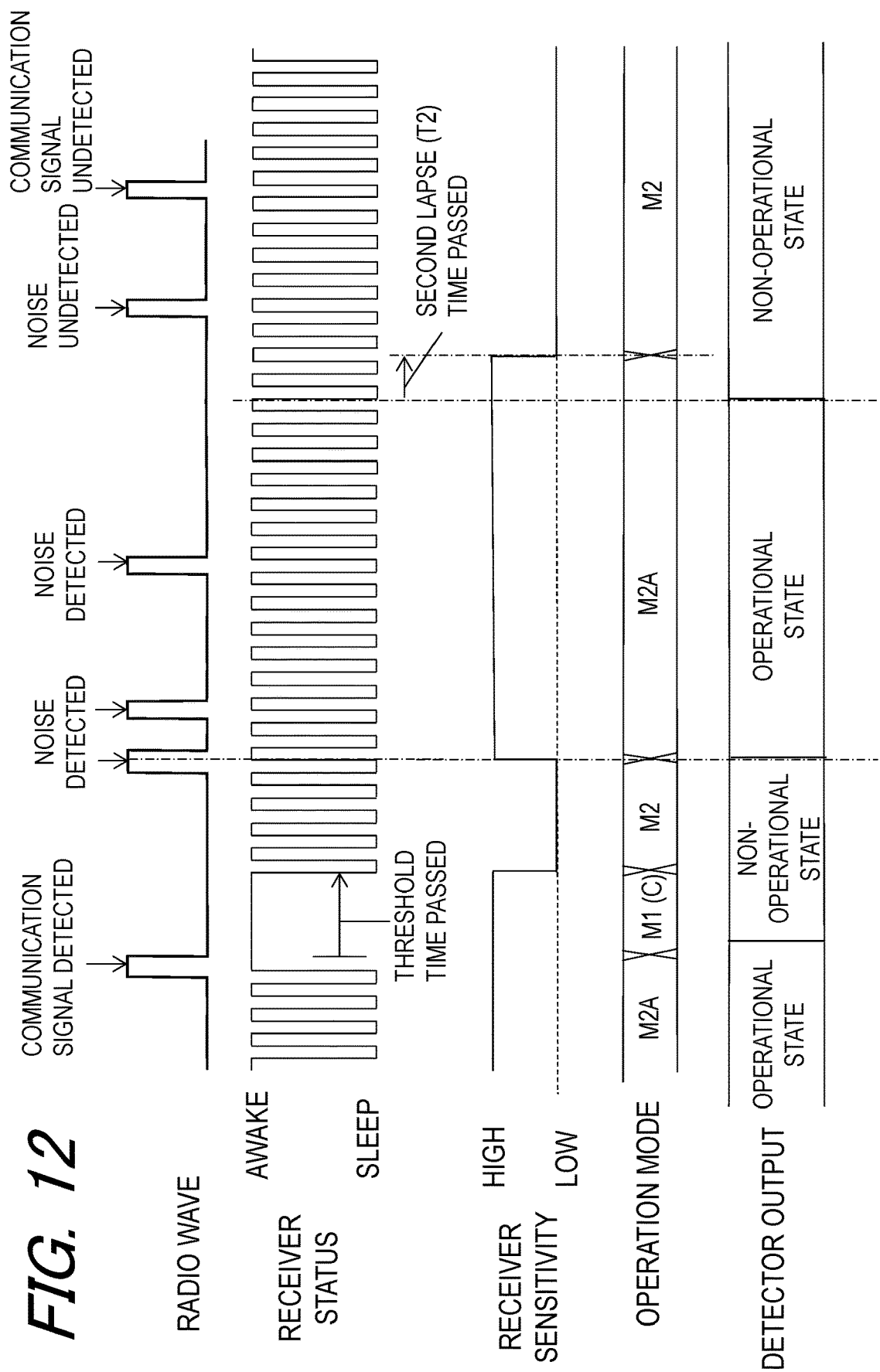
FIG. 12 is a timing chart of the first mode, the second mode, and an additional second mode of the wireless receiving device illustrated in FIG. 11 in accordance with the second embodiment.

As seen in FIG. 11, the wireless receiving device 112 for the human powered vehicle 1 comprises the receiver RV' and the controller CC'. The receiver RV' is configured to wirelessly receive the radio wave including the communication signal to communicate with a component of the human powered vehicle (e.g. at least one of the derailleur 14, the adjustable seatpost 16, the suspension 18, and the auxiliary drive unit 20). The receiver RV' is configured to execute at least one of the operation modes including the first mode M1, the second mode M2 in which the receiver RV' consumes less electric power than in the first mode M1, and an additional second mode M2A in which the receiver RV' consumes less electric power than in the first mode M1 and consumes more electric power than in the second mode M2. That is, the receiver RV' is configured to operate in at least one of the operation modes including the first mode M1, the second mode M2, and the additional second mode M2A. As seen in FIG. 12, the receiver RV is configured to receive the radio wave in an awake period. The receiver RV' is configured not to receive the radio wave in a sleep period. The awake period and the sleep period occur while the receiver RV' is in the additional second mode M2A. As seen in FIG. 12, during the awake period, a sensitivity of the receiver RV' in the additional second mode M2A is higher than a sensitivity of the receiver RV' in the second mode M2. Accordingly, a sensitivity of the receiver RV' in the additional second mode M2A is higher than a sensitivity of the receiver RV' in the second mode M2. Here, the sensitivity is, for example, an antenna gain of the receiver RV'. Hereinafter, an additional-second-mode period can be referred to as a period during which the receiver RV' operates in the additional second mode M2A. In the second embodiment, the receiver RV' can detect the radio wave in both the second mode M2 and the additional second mode M2A, but the possibility of detecting the radio wave is higher in the additional second mode M2 than in the second mode M2.

When the receiver RV' detects the radio wave in either of the second mode M2 and the additional second mode M2A, the controller CC determines whether the radio wave is the communication signal by checking for example, a Service Set Identifier (SSID), a header message, or a signature of the radio wave. If the radio wave is the communication signal as shown at the end of the first additional-second-mode period in FIG. 12, then the controller CC' changes the operation mode of the receiver RV' from the additional second mode M2A to the first mode M1. That is, the controller CC' is configured to set the receiver RV' with the first mode M1 if the receiver RV' receives the communication signal in the additional second mode M2A. In addition, if the radio wave is the communication signal as shown at the end of the second second-mode period in FIG. 14, then the controller CC' is configured to set the receiver RV' with the first mode M1 if the receiver RV' receives the communication signal in the second mode M2. In other words, the controller CC' is configured to control the receiver RV' to operate in the first mode M1 if the receiver RV' receives the communication signal in the second mode M2. The controller CC' is configured to control the receiver RV' to operate in the first mode M1 if the receiver RV' receives the communication signal in the second mode M2.

Further, as shown in FIG. 12, the controller CC' is configured to set the receiver RV' with the second mode M2 if the receiver RV' does not receive the communication signal and the sensor (at least one of Sr1-Sr4, Sv1-Sv2, Sp1-Sp3, Ss1-Ss2, and Sk) does not detect information regarding an operational state of the human powered vehicle 1 in the first-mode period. "The receiver RV' does not receive the communication signal in the first-mode period" can mean "the receiver RV' has received no communication signal for the threshold time in the first-mode period since the receiver RV' received the last communication signal." Accordingly, the controller CC' is configured to control the receiver RV' to operate in the second mode M2 if the receiver RV' has received no communication signal for the threshold time in the first-mode period since the receiver RV' received the last communication signal and the sensor (at least one of Sr1-Sr4, Sv1-Sv2, Sp1-Sp3, Ss1-Ss2, and Sk) does not detect information regarding an operational state of the human powered vehicle 1 in the first-mode period. The threshold time is preferably less than one hour. As seen in an example of FIG. 12, at a time point when the threshold time has passed, the human powered vehicle 1 is in the non-operational state. Accordingly, the operation mode of the receiver RV' is changed from the first mode M1 to the second mode M2. However, the controller CC' is configured to control the receiver RV' to continue operating in the first mode M1 while the sensor (at least one of Sr1-Sr4, Sv1-Sv2, Sp1-Sp3, Ss1-Ss2, and Sk) detects the information in the first-mode period. Accordingly, if the human powered vehicle 1 is in the operational state when the threshold time has passed, the receiver RV' still operates in the first mode M1. In this case, the operation mode of the receiver RV' is changed from the first mode M1 to the second mode M2 when the human powered vehicle 1 becomes in the non-operational state after the threshold time has passed.

Then, as seen in FIG. 12, the controller CC' is configured to set the receiver RV' with the additional second mode M2A if the sensor (at least one of Sr1-Sr4, Sv1-Sv2, Sp1-Sp3, Ss1-Ss2, and Sk) detects information regarding an operational state of the human powered vehicle 1 in the second-mode period during which the receiver RV' operates in the second mode M2. That is, the controller CC' is configured to control the receiver RV' to operate in the additional second mode M2A if the sensor (at least one of Sr1-Sr4, Sv1-Sv2, Sp1-Sp3, Ss1-Ss2, and Sk) detects information regarding an operational state of the human powered vehicle 1 in the second-mode period. In an example of FIG. 12, the receiver RV' receives noises in the second additional second mode M2A, but the operation mode of the receiver RV' is not changed to the first mode M1, because the noises are not the communication signals.

Further, as shown after the second additional-second-mode period in FIG. 12, the controller CC' is configured to set the receiver RV' with the second mode M2 after a second lapse time T2 passes since the controller CC' starts controlling the receiver RV' to operate in the additional second mode M2A. That is, the controller CC' is configured to control the receiver RV' to operate in the second mode M2 after the second lapse time T2 passes since the controller CC' starts controlling the receiver RV' to operate in the additional second mode M2A. Preferably, the second lapse time T2 is shorter than the threshold time. The second lapse time T2 is preferably shorter than one minute. Since the additional second mode M2A starts whenever the detector DT detects the operational state of the human powered vehicle 1 in the second-mode period, the operation mode of the receiver RV' is changed to the second mode M2 after the second lapse time T2 passes since the detector DT detects the non-operational state of the human powered vehicle 1.

After the receiver RV' starts operating in the second mode M2, the receiver RV' tends not to detect radio waves because sensitivity in the second mode M2 is lower than sensitivity in the additional second mode M2A. FIG. 12 shows last two radio waves as examples which are not detected by the receiver RV'.

In the second embodiment, the receiver RV' can tend to operate in the additional second mode M2A when the human powered vehicle 1 is in the operational state, whereas the receiver RV' can tend to operate in the second mode M2 when the human powered vehicle 1 is in the non-operational state. The receiver RV' tends not to detect radio waves in the second mode M2 compared to the additional second mode M2A. Accordingly, it is possible to reduce power consumption when the human powered vehicle 1 is not operated.

Modifications of Second Embodiment

Figure 13:
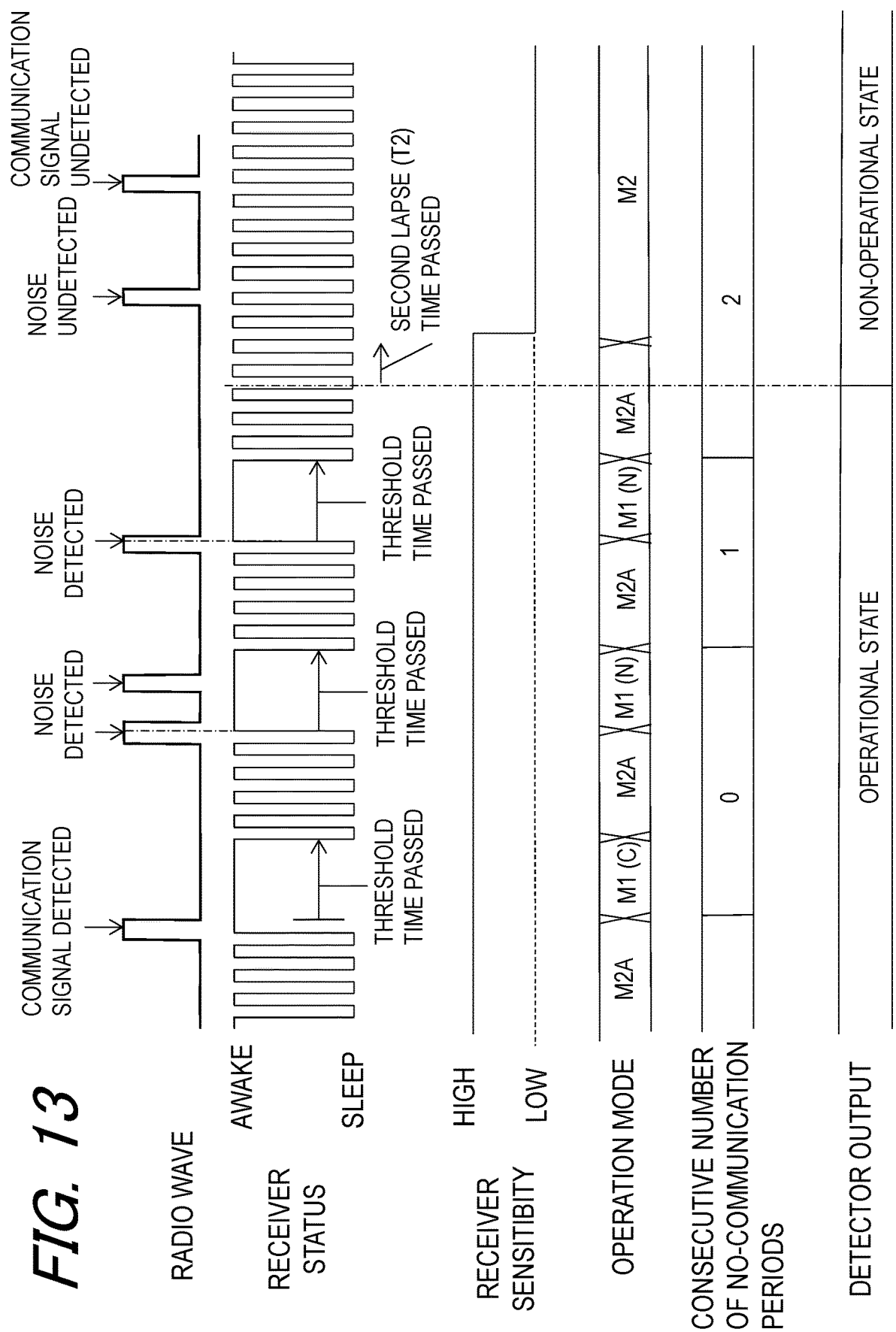
FIG. 13 is a timing chart of the first mode, the second mode, and the additional second mode of the wireless receiving device illustrated in FIG. 11 in accordance with a modification of the second embodiment.

Unlike the controller CC' and the receiver RV' described above, the wireless receiving device 112 can have functions of the controller CC and receiver RV in the first embodiment with the functions of the additional second mode M2A described in the second embodiment. In this case, the operation mode of the receiver is changed to the first mode M1 when the receiver receives the radio wave in either of the second mode M2 and the additional second mode M2A. The controller is configured to set the receiver with the additional second mode M2A if the sensor (at least one of Sr1-Sr4, Sv1-Sv2, Sp1-Sp3, Ss1-Ss2, and Sk) detects information regarding the operational state of the human powered vehicle 1 in the second-mode period during which the receiver operates in the second mode M2. The controller is configured to set the receiver with the second mode M2 after the second lapse time T2 passes since the controller starts controlling the receiver in the additional second mode M2A. FIG. 13 illustrates a function of such modification. As shown in FIG. 13, when the detector DT detects the operational state of the human powered vehicle 1, it is likely that the operation mode of the receiver would be the additional second mode or the first mode. Contrary to this, after second lapse time T2 has passed since the detector DT detects the non-operational state of the human powered vehicle 1. In this modification, it is possible to reduce power consumption when the human powered vehicle 1 is not operated.

Figure 14:
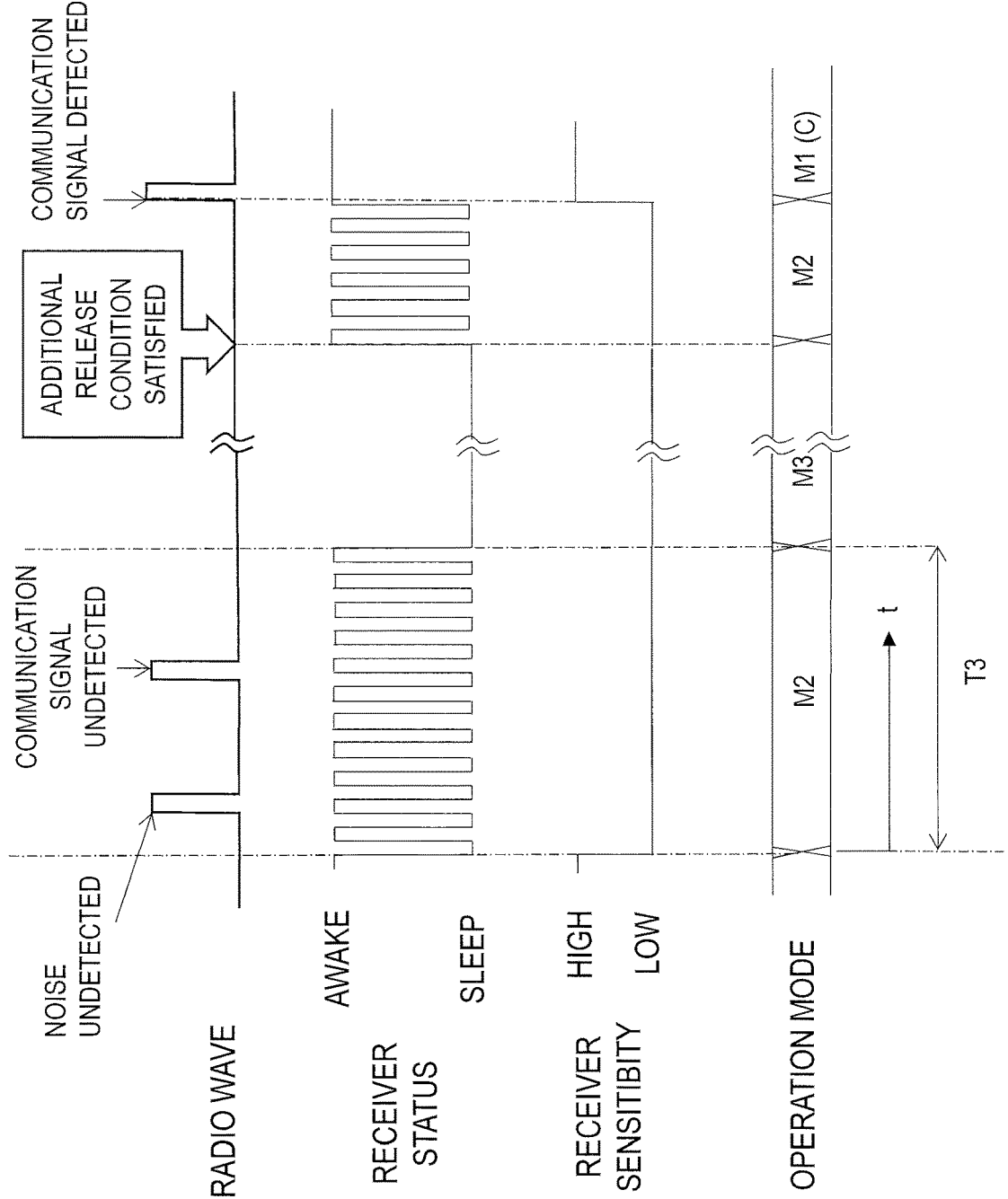
FIG. 14 is a timing chart of the second and the third mode of the wireless receiving device illustrated in FIG. 11 in accordance with another modification of the second embodiment.

Further, in another modification as shown in FIG. 14, the operation modes can further include a third mode M3 in which the receiver RV' consumes less electric power than in the second mode M2. The features of the third mode M3 and mode transition between the second mode M2 and the third mode M3 is the same as those described in the modification of the first embodiment. FIG. 14 shows an example in which the third lapse time T3 passes since the controller CC starts controlling the receiver RV' to operate in the second mode M2. In this example, the receiver RV' doesn't detect the communication signal. Unlike the modification of the first embodiment, it does not affect mode transition whether the receiver RV' detects noises in the second-mode period. In this modification, the third lapse time T3 is longer than the second lapse time T2 and the threshold time. The third lapse time T3 is preferably more than one day. More preferably, the third lapse time T3 is more than one week (e.g. two weeks), because the third mode is used when a user doesn't use the human powered vehicle 1 for a long time. The release condition in this modification is the same as that in the modification of the first embodiment.

In another modification of the second embodiment, the controller CC' can be configured to set the receiver RV' with the second mode M2 after the second lapse time T2 passes without the receiver RV' receiving the communication signal since the controller CC' starts controlling the receiver RV' to operate in the additional second mode M2A even when the human powered vehicle 1 is in the operational state. In this case, the controller CC' don't need to set the receiver RV' with the additional second mode M2A when the sensor (at least one of Sr1-Sr4, Sv1-Sv2, Sp1-Sp3, Ss1-Ss2, and Sk) detects information regarding the operational state of the human powered vehicle 1 in the second-mode period. Instead, the controller CC' can be configured to set the receiver RV' with the additional second mode M2A when the release mechanism is manipulated or the first lapse time T1 passes since the controller CC' as described in the first embodiment.

Third Embodiment

Figure 15:
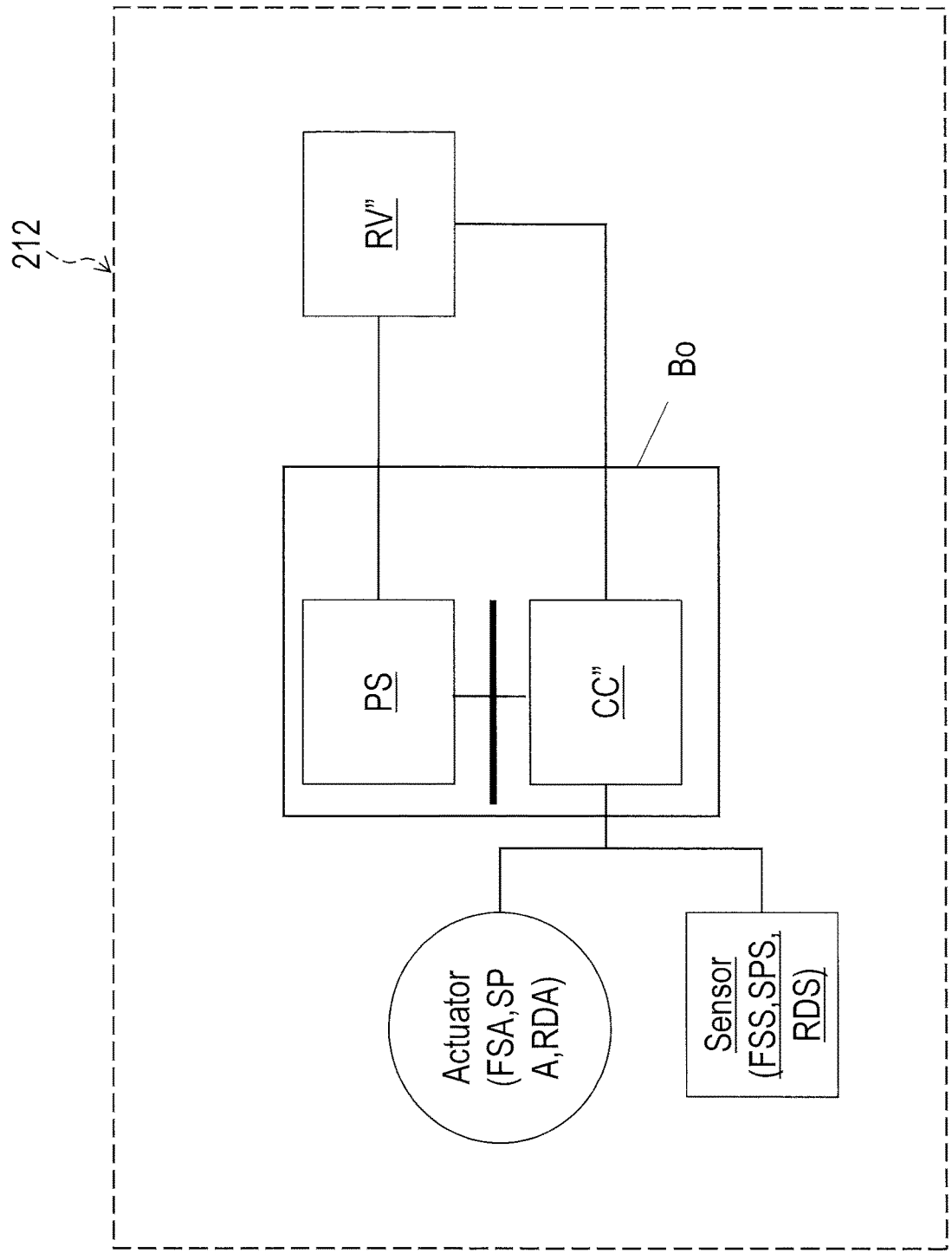
FIG. 15 illustrates a schematic structure of a wireless receiving device in accordance with a third embodiment.

A wireless receiving device 212 provided in accordance with a third embodiment will be described below referring to FIG. 15. The wireless receiving device 212 has the same structure and/or configuration as those of the wireless receiving devices 12 and 112 except the controller CC" and the receiver RV'". In the third embodiment, the controller CC" and the receiver RV'" of the wireless receiving device 112 operate in a different manner from a manner in which the controllers CC, CC' and the receivers RV, RV" operate in the first and second embodiments. Thus, elements having substantially the same function as those in the first and the second embodiments will be numbered the same here, and will not be described and/or illustrated again in detail here for the sake of brevity As seen in FIG. 15, the wireless receiving device 212 for the human powered vehicle 1 comprises the receiver RV'" and the controller CC". The receiver RV'" is configured to wirelessly receive the radio wave including the communication signal to communicate with a component of the human powered vehicle (e.g. at least one of the derailleur 14, the adjustable seatpost 16, the suspension 18, and the auxiliary drive unit 20). The receiver RV'" is configured to execute at least one of the operation modes including the first mode M1, and the third mode M3 in which the receiver RV'" consumes less electric power than in the first mode M1 That is, the receiver RV'" is configured to operate in at least one of the operation modes including the first mode M1 and the third mode M3. As seen in FIG. 16, the receiver RV'" is configured to receive the radio wave in an awake period. The receiver RV'" is configured not to receive the radio wave in a sleep period. A period during which the receiver RV'" is in the first mode M1 is the awake mode. An entire period during which the receiver RV'" is in the third mode M3 is the sleep period.

As shown in FIG. 16, the controller CC" is configured to set the receiver RV'" with the third mode M3 if the third lapse time T3 passes since the receiver RV'" receives the last communication signal. That is, the controller CC" is configured to control the receiver RV'" to operate in the third mode M3 if the third lapse time T3 passes since the receiver RV'" receives the last communication signal. The third lapse time T3 is the same as that defined in the modification of the first embodiment. As seen in FIG. 16, an elapsed time t after the receiver RV" receives the last communication signal and the third lapse time T3 are illustrated. The receiver RV" starts operating in the third mode M3 after the elapsed time t becomes larger than the third lapse time T3. In addition, when the receiver RV" does not receive the communication signal in an entirety of the first-mode period, the controller CC" is configured to set the receiver RV" with the third mode M3 if the third lapse time T3 passes since the controller CC" starts controlling the receiver RV" to operate in the first mode M1. A time at which the controller CC" starts controlling the receiver RV" to operate in the first mode M1 is described later.

After the receiver RV" starts operating in the third mode M3, the controller CC" is configured to control the receiver RV" to continue operating in the third mode M3 until the additional release condition is satisfied. Then, the controller CC" is configured to set the receiver RV" with the first mode M1 after the additional release condition is satisfied while the receiver RV" operates in the third mode M3. That is, the controller CC" is configured to control the receiver RV" to operate in the first mode M1 after the additional release condition is satisfied while the receiver RV" operates in the third mode M3. In other words, the time at which the controller CC" starts controlling the receiver RV" to operate in the first mode M1 is when the additional release condition is satisfied. As described in the modification of the first embodiment, the additional release condition is, for example, as follows:

(1) The additional release condition is a condition in which the release mechanism RM is manipulated. The release mechanism RM can be the mechanism with which the release condition is satisfied. The release mechanism RM can have the indicator as shown above.

(2) The additional release condition is a condition in which the sensor (at least one of Sr1-Sr4, Sv1-Sv2, Sp1-Sp3, Ss1-Ss2, and Sk) detects information regarding an operational state of the human powered vehicle 1. At least one of the bicycle lock-state sensor Sk and the pressure sensors Sp1 and Sp3 are preferably used to detect the operational state of the human powered vehicle 1, because outputs of these sensors indicate high possibility of operation of the human powered vehicle 1.

As for the wireless receiving device 212, when the user does not use the human powered vehicle 1 for a long time, which is more than the third lapse time T3, the controller CC" controls the receiver RV" to operate in the third mode M3 in which the receiver RV" consumes less electric power than in the second mode M2. Accordingly, it is possible to reduce power consumption when the human powered vehicle 1 is not operated.

Other Modifications

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element." Further, some of the first threshold time period to the eighth threshold time period may have a same time length, but all of them may have a different time length.

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless receiving device for a human powered vehicle, comprising:
 a receiver configured to wirelessly receive a radio wave including a communication signal to communicate with a component of the human powered vehicle, the receiver being configured to execute at least one operation mode including:
  a first mode, and
  a second mode in which the receiver consumes less electric power than in the first mode; and
 a controller configured to
  set the receiver in the second mode when the receiver does not receive the communication signal in a first-mode period during which the receiver operates in the first mode,
  count a number of consecutive no-communication periods when no-communication periods consecutively occur, each of the no-communication periods being a period in which the receiver does not receive the communication signal during an entirety of the first-mode period,
  set the receiver in the first mode when the number of the consecutive no-communication periods is less than a count threshold, and
  control the receiver to continue operating in the second mode until a release condition is satisfied when the number of the consecutive no-communication periods is more than or equal to the count threshold.

2. The wireless receiving device according to claim 1, wherein
 the receiver does not receive the communication signal in the first-mode period when the receiver does not receive the communication signal for a threshold time in the first-mode period.

3. The wireless receiving device according to claim 1, wherein
 the receiver does not receive the communication signal in the first-mode period when the receiver receives the radio wave other than the communication signal in the first-mode period.

4. The wireless receiving device according to claim 1, wherein
 the controller is configured to set the receiver in the first mode when the receiver receives the radio wave while the receiver operates in the second mode, after the release condition is satisfied.

5. The wireless receiving device according to claim 1, wherein
the release condition is a condition in which a first lapse time passes after the number of the consecutive no-communication signal periods becomes more than or equal to the count threshold.

6. The wireless receiving device according to claim 1, wherein
the release condition is a condition in which a release mechanism is manipulated after the number of the consecutive no-communication signal periods becomes more than or equal to the count threshold.

7. The wireless receiving device according to claim 1, wherein
the release condition is a condition in which a sensor detects information regarding an operational state of the human powered vehicle after the number of the consecutive no-communication signal periods becomes more than or equal to the count threshold.

8. The wireless receiving device according to claim 1, wherein
the receiver is configured to receive the radio wave in an awake period,
the receiver is configured not to receive the radio wave in a sleep period, and
an entire period during which the receiver is in the first mode is the awake period.

9. The wireless receiving device according to claim 1, wherein
the receiver is configured to receive the radio wave in an awake period,
the receiver is configured not to receive the radio wave in a sleep period, and
the awake period and the sleep period occur while the receiver is in the second mode.

10. A wireless receiving device for a human powered vehicle, comprising:
a receiver configured to wirelessly receive a radio wave including a communication signal to communicate with a component of the human powered vehicle, the receiver being configured to execute at least one operation mode including:
a first mode,
a second mode in which the receiver consumes less electric power than in the first mode, and
an additional second mode in which the receiver consumes less electric power than in the first mode and consumes more electric power than in the second mode, a sensitivity of the receiver in the additional second mode being higher than a sensitivity of the receiver in the second mode, and
a controller configured to
set the receiver in the additional second mode when a sensor detects information regarding an operational state of the human powered vehicle in a second-mode period during which the receiver operates in the second mode, and
set the receiver in the first mode regardless of the operational state of the human powered vehicle when the receiver receives the communication signal in the additional second mode.

11. The wireless receiving device according to claim 10, wherein
the controller is configured to set the receiver in the second mode after a second lapse time passes since the controller starts controlling the receiver to operate in the additional second mode.

12. The wireless receiving device according to claim 10, wherein
the receiver is configured to receive the radio wave in an awake period,
the receiver is configured not to receive the radio wave in a sleep period, and
the awake period and the sleep period occur while the receiver is in the additional second mode.

13. The wireless receiving device according to claim 10, wherein
the controller is configured to
set the receiver in the second mode when the receiver does not receive the communication signal and a sensor does not detect information regarding an operational state of the human powered vehicle in the first-mode period, and
control the receiver to continue operating in the first mode while the sensor detects information in the first-mode period.

14. The wireless receiving device according to claim 10, wherein the controller is configured to set the receiver in the first mode when the receiver receives the communication signal in the second mode.

15. The wireless receiving device according to claim 10, wherein the additional second mode remains for a lapse time after the sensor detects information regarding a non-operational state of the human powered vehicle in an additional second mode period during which the receiver operates in the additional second mode.

16. The wireless receiving device according to claim 10, wherein
the operational state is detected by at least one of a vibration sensor, a pressure sensor, a strain sensor, or a bicycle lock-state sensor.

17. The wireless receiving device according to claim 10, wherein
the at least one operation mode further includes a third mode in which the receiver consumes less electric power than in the second mode, and
the controller is configured to
set the receiver with the third mode if a third lapse time passes since the controller starts controlling the receiver to operate in the second mode, and
control the receiver to continue operating in the third mode until an additional release condition is satisfied while the receiver operates in the third mode.

18. The wireless receiving device according to claim 17, wherein
the receiver is configured to receive the radio wave in an awake period,
the receiver is configured not to receive the radio wave in a sleep period, and
an entire period during which the receiver is in the third mode is the sleep period.

19. The wireless receiving device according to claim 17, wherein
the additional release condition is a condition in which a release mechanism is manipulated when the receiver operates in the third mode.

20. The wireless receiving device according to claim 17, wherein
the additional release condition is a condition in which a sensor detects information regarding an operational state of the human powered vehicle when the receiver operates in the third mode.

21. A wireless receiving device for a human powered vehicle, comprising:

a receiver configured to wirelessly receive a radio wave including a communication signal to communicate with a component of the human powered vehicle, the receiver being configured to execute at least one operation mode including:
   a first mode; and
   a third mode in which the receiver consumes less electric power than in the first mode; and
a controller configured to
   control the receiver to continue operating in the third mode until an additional release condition is satisfied, and
   set the receiver in the first mode after the additional release condition is satisfied while the receiver operates in the third mode,
wherein the additional release condition includes a condition in which a release mechanism is manipulated.

22. The wireless receiving device according to claim 21, wherein
the receiver is configured to receive the radio wave in an awake period,
the receiver is configured not to receive the radio wave in a sleep period,
a period during which the receiver operates in the first mode is the awake mode, and
an entire period during which the receiver is in the third mode is the sleep period.

23. The wireless receiving device according to claim 21, wherein
the additional release condition includes a condition in which a sensor detects information regarding an operational state of the human powered vehicle.

24. The wireless receiving device according to claim 21, wherein
the release mechanism includes an indicator, and
the controller is configured to control the indicator to indicate an operational state of the human powered vehicle when a sensor detects information regarding the operational state of the human powered vehicle.

25. The wireless receiving device according to claim 24, wherein
the indicator includes at least one of a light emitter, a speaker, and a vibrator.

26. The wireless receiving device according to claim 24, wherein
the operational state is detected by at least one of a vibration sensor, a pressure sensor, a strain sensor, or a bicycle lock-state sensor.

\* \* \* \* \*